US007720219B1

(12) United States Patent
Olson et al.

(10) Patent No.: US 7,720,219 B1
(45) Date of Patent: May 18, 2010

(54) APPARATUS AND METHOD FOR IMPLEMENTING A HASH ALGORITHM WORD BUFFER

(75) Inventors: Christopher H. Olson, Austin, TX (US); Leonard D. Rarick, Los Altos, CA (US); Gregory F. Grohoski, Austin, TX (US)

(73) Assignee: Oracle America, Inc., Redwood Shores, CA (US)

( * ) Notice: Subject to any disclaimer, the term of this patent is extended or adjusted under 35 U.S.C. 154(b) by 1486 days.

(21) Appl. No.: 10/968,406

(22) Filed: Oct. 19, 2004

(51) Int. Cl.
*H04K 1/00* (2006.01)
*H04L 9/00* (2006.01)
*H04L 9/28* (2006.01)

(52) U.S. Cl. .............................. 380/28; 712/1; 712/36; 712/206

(58) Field of Classification Search .................. 380/28; 712/1, 36, 206
See application file for complete search history.

(56) References Cited

U.S. PATENT DOCUMENTS

| 5,357,617 | A | * | 10/1994 | Davis et al. ................. 712/245 |
| 5,404,552 | A | * | 4/1995 | Ikenaga ........................ 712/41 |
| 6,047,375 | A | * | 4/2000 | Easter et al. ................. 713/189 |
| 6,857,064 | B2 | * | 2/2005 | Smith et al. ................. 712/244 |
| 7,142,669 | B2 | * | 11/2006 | Dworkin et al. ............... 380/28 |
| 7,213,148 | B2 | * | 5/2007 | Anand ......................... 713/168 |
| 2002/0066014 | A1 | * | 5/2002 | Dworkin et al. ............. 713/168 |
| 2002/0116600 | A1 | * | 8/2002 | Smith et al. ................. 712/218 |
| 2002/0191792 | A1 | * | 12/2002 | Anand ......................... 380/255 |

OTHER PUBLICATIONS

"Announcing the Advanced Encryption Standard (AES)," Federal Information Processing Standards Publication 197, Nov. 26, 2001, (51 Pages).
R. Rivest, "RFC1321" http://www.faqs.org/rfcs/rfc1321.html, Apr. 1992, (18 pages).
"Announcing the Secure Hash Standard," Federal Information Processing Standards Publication 180-2, Aug. 1, 2002, (71 Pages).

* cited by examiner

*Primary Examiner*—Christian LaForgia
*Assistant Examiner*—James Turchen
(74) *Attorney, Agent, or Firm*—Robert C. Kowert; Meyertons, Hood, Kivlin, Kowert & Goetzel, P.C.

(57) ABSTRACT

An apparatus and method for implementing a hash algorithm word buffer. In one embodiment, a cryptographic unit may include hash logic configured to compute a hash value of a data block according to a hash algorithm, where the hash algorithm includes a plurality of iterations, and where the data block includes a plurality of data words. The cryptographic unit may further include a word buffer comprising a plurality of data word positions and configured to store the data block during computing by the hash logic, where subsequent to the hash logic computing one of the iterations of the hash algorithm, the word buffer is further configured to linearly shift the data block by one or more data word positions according to the hash algorithm. The hash algorithm may be dynamically selectable from a plurality of hash algorithms.

36 Claims, 14 Drawing Sheets

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

FIG. 3

| Cycle   | 1            | 2                              | 3                          | 4                              |
|---------|--------------|--------------------------------|----------------------------|--------------------------------|
| Stage 1 |              | T12(Aq,L,W,K) rotate(T12, s)   |                            | T12(Aq,L,W,K) rotate(T12, s)   |
| Stage 2 | Ln(Bq,Cq,Dq) |                                | T3(Bq,T12) Ln(Bn,Cn,Dn)    |                                |

*FIG. 14A*

| Cycle   | 1            | 2                                  | 3                       | 4                                  |
|---------|--------------|------------------------------------|-------------------------|------------------------------------|
| Stage 1 |              | T12(s5(Aq),L,W,K) rotate(T12, 0)   |                         | T12(s5(Aq),L,W,K) rotate(T12, 0)   |
| Stage 2 | Ln(Bq,Cq,Dq) |                                    | T3(Eq,T12) Ln(Bn,Cn,Dn) |                                    |

*FIG. 14B*

| Cycle   | 1            | 2                            | 3                                  | 4                            |
|---------|--------------|------------------------------|------------------------------------|------------------------------|
| Stage 1 |              | T12(Hq,bs_1(Eq),L,W,K)       | T12(T12,bs_0(Aq), Maj(Aq,Bq,Cq))   | T12(Hq,bs_1(Eq),L,W,K)       |
| Stage 2 | Ln(Eq,Fq,Gq) | Maj(Aq,Bq,Cq) bs_0(Aq)       | T3(T12,Dq) Ln(Eq,Fq,Gq)            | Maj(Aq,Bq,Cq) bs_0(Aq)       |

APPARATUS AND METHOD FOR IMPLEMENTING A HASH ALGORITHM WORD BUFFER

BACKGROUND OF THE INVENTION

1. Field of the Invention

This invention relates to processors and, more particularly, to implementation of hash algorithms.

2. Description of the Related Art

Verifying the integrity of data, such as file data, program code, or communications data, for example, has become an increasing concern as electronic commerce and communication proliferates. For example, data integrity is continually under threat as new forms of computer viruses and other malware emerge. Moreover, stored data is subject to corruption due to unintentional events such as hardware failure, data communication errors, and the like. Compromised or corrupted data may result in undesirable consequences ranging from transient application malfunction to widespread data loss, data theft, or total system failure.

To provide a means for ascertaining data integrity, various types of hash algorithms have been developed. Generally speaking, a hash algorithm may be configured to generate a condensed representation, or hash value, of an input stream of data. For typical hash algorithms, any change to the input data stream may result in differing hash values. Thus, if a given computed hash value of a data stream does not match an earlier-computed hash value of that data stream, the integrity of the data stream may have been compromised. As an example, "known good" hash values of a data stream may be computed before the data stream is conveyed via an insecure medium and conveyed along with the data stream. At the receiving end, the hash value of the received data stream may be computed and compared against the received hash value to provide a data integrity check.

Numerous different types of hash algorithms have been defined, and increasingly sophisticated hash algorithms continue to be developed. To improve execution performance of such algorithms, they may be implemented within processor hardware. However, implementing separate processor resources for each hash algorithm may result in detrimental effects to processor area, production cost, power consumption, and other implementation or manufacturing factors.

SUMMARY

Various embodiments of an apparatus and method for implementing a hash algorithm word buffer are disclosed. In one embodiment, a cryptographic unit may include hash logic configured to compute a hash value of a data block according to a hash algorithm, where the hash algorithm includes a plurality of iterations, and where the data block includes a plurality of data words. The cryptographic unit may further include a word buffer comprising a plurality of data word positions and configured to store the data block during computing by the hash logic, where subsequent to the hash logic computing one of the iterations of the hash algorithm, the word buffer is further configured to linearly shift the data block by one or more data word positions according to the hash algorithm. The hash algorithm may be dynamically selectable from a plurality of hash algorithms.

In one specific implementation of the cryptographic unit, during computation of a given iteration of the hash algorithm, the hash logic may be further configured to receive an input data word from a fixed data word position of the word buffer.

A method is further contemplated that in one embodiment may include dynamically selecting a hash algorithm from a plurality of hash algorithms, and computing a hash value of a data block according to a hash algorithm, where the hash algorithm includes a plurality of iterations, and where the data block includes a plurality of data words. The method may further include storing the data block during the computing in a word buffer comprising a plurality of data word positions, and subsequent to computing one of the iterations of the hash algorithm, linearly shifting the data block by one or more data word positions according to the hash algorithm.

BRIEF DESCRIPTION OF THE DRAWINGS

FIG. 3 is a pipeline diagram illustrating the flow of instructions through one embodiment of a processor core.

FIGS. 14A-C are pipeline diagrams illustrating the flow of operations through hash pipeline logic for several exemplary hash algorithms.

Figure 1:
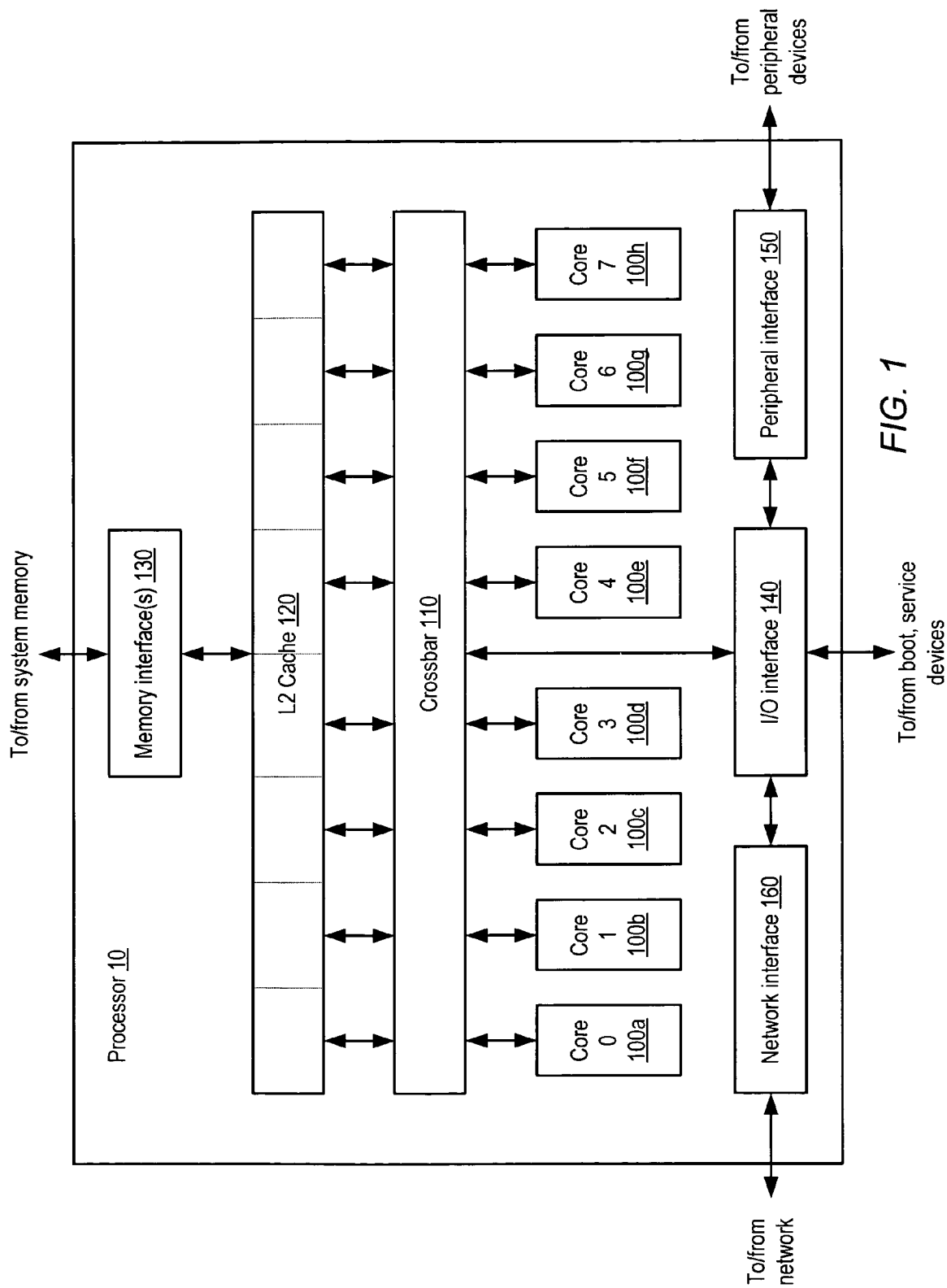
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory, interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
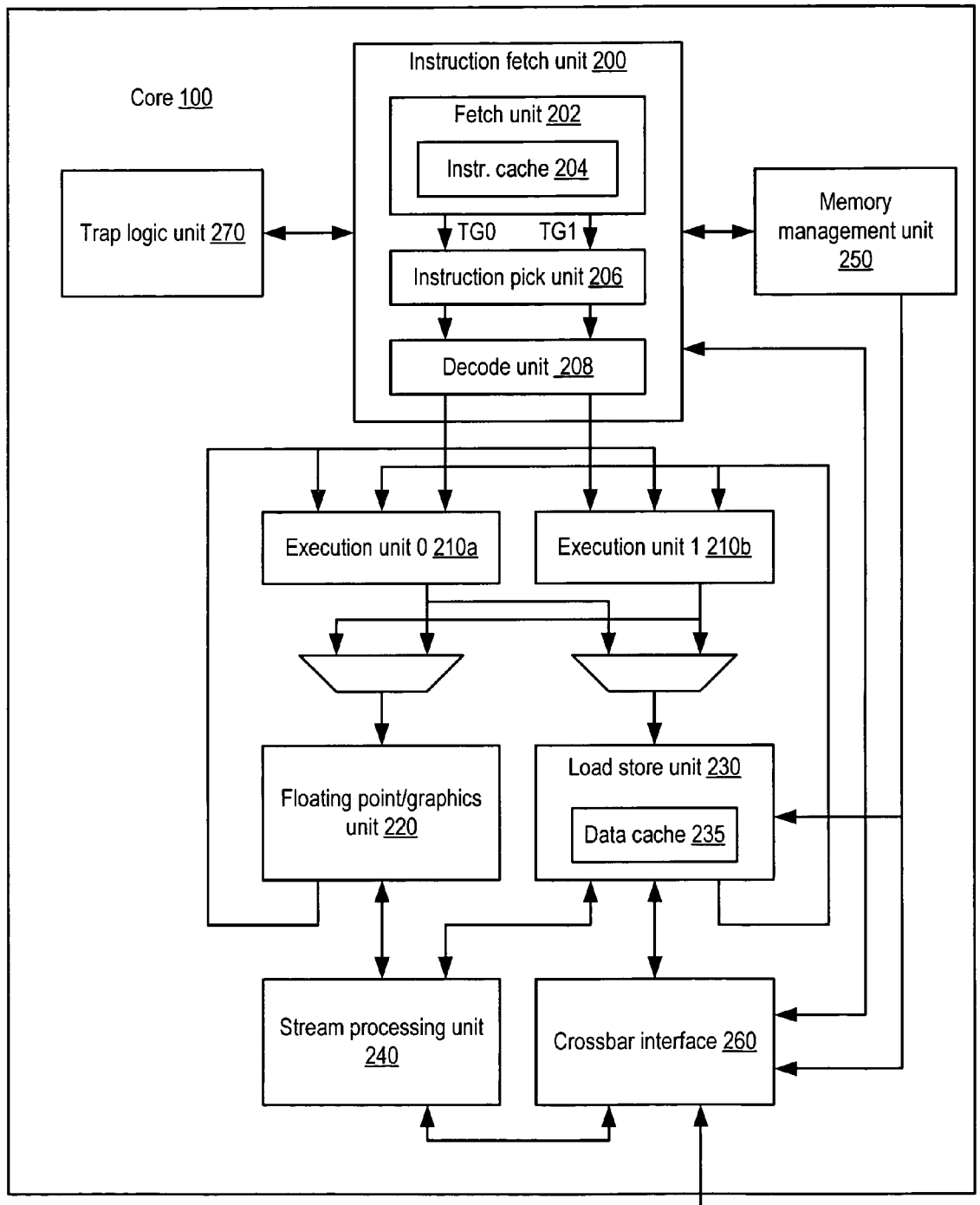
FIG. 2 is a block diagram illustrating one embodiment of a processor core configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic subunits independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed, externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed.

It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Hash Algorithm Word Buffer

As noted above, in some embodiments SPU 240 may be configured to implement different types of data processing algorithms. In one embodiment, SPU 240 may be configured to implement one or more cryptographic algorithms, and may be alternately referred to as a cryptographic unit (although it is noted that SPU 240 may also implement non-cryptographic algorithms in addition to or instead of cryptographic algorithms). In some embodiments, SPU 240 may be configured to implement one or more cryptographic hash algorithms, which may also be referred to as secure hash algorithms or simply as hash algorithms. Generally speaking, a hash algorithm is an algorithm configured to produce a condensed representation of an input stream of data, or message. Such a condensed representation may also be referred to variously as a hash, hash value, signature, fingerprint, or digest of the input message. A hash algorithm may be cryptographically secure to the extent that it is computationally difficult to construct a message that generates a given hash value or to construct two different messages that each generate the same hash value. These properties may yield a very high probability that any modification to a given message (in some cases, even of only one bit) will result in a different hash value. Among various other applications, hash algorithms may be useful for ensuring data integrity, for example by enabling the detection of changes to a message due to errors or tampering.

One example of a hash algorithm is given by the Message Digest 5 (MD5) standard, one version of which is published as Request for Comments (RFC) 1321, as promulgated by the Internet Engineering Task Force (IETF). In one embodiment, the MD5 algorithm iteratively processes a message in 512-bit blocks to produce a 128-bit hash of the message, as described in greater detail below.

Other examples of hash algorithms are given by the Secure Hash Signature Standard, one version of which is published as Federal Information Processing Standards Publication 180-2 (FIPS 180-2), dated Aug. 1, 2002. In the FIPS 180-2 specification, several hash algorithms are described, including Secure Hash Algorithm (SHA)-1, SHA-256, SHA-384 and SHA-512. In one embodiment, the SHA-1 and SHA-256 algorithms iteratively process a message in 512-bit blocks to produce a 160-bit hash and a 256-bit hash of the message, respectively, as described in greater detail below. The SHA-384 and SHA-512 algorithms iteratively process a message in 1024-bit blocks to produce a 384-bit hash and a 512-bit hash, respectively. It is contemplated that in some embodiments, other hash algorithms using different block sizes and producing differently-sized hash values may be employed.

Figure 4:
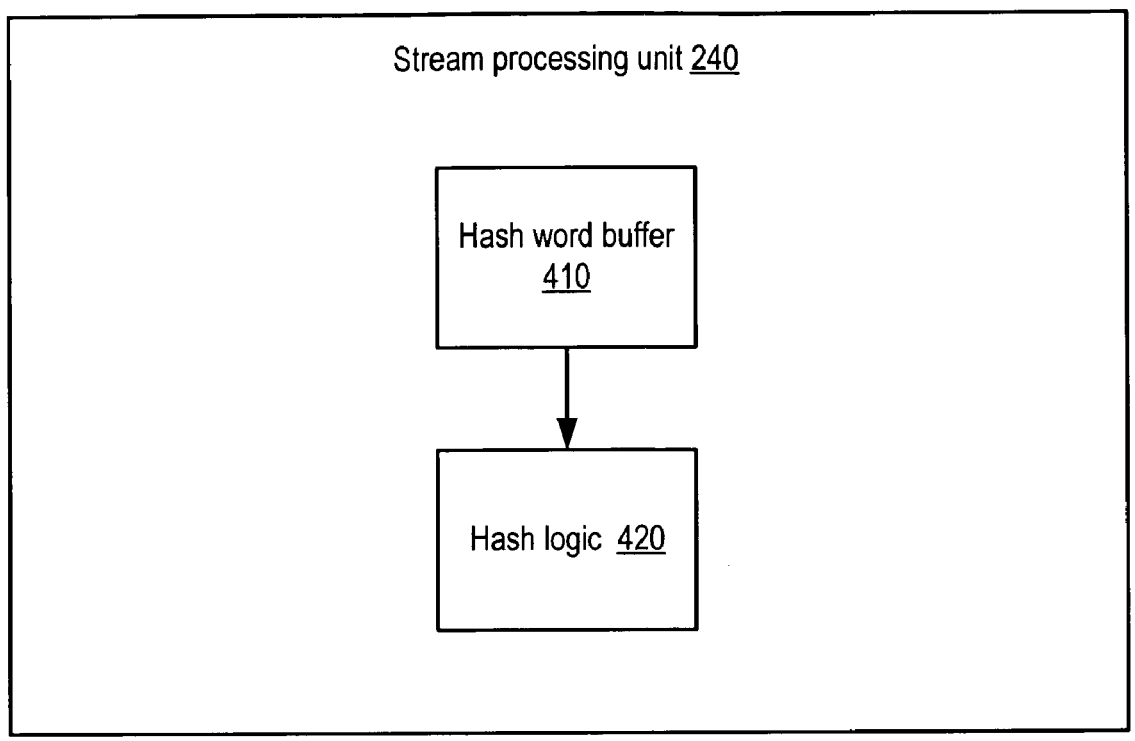
FIG. 4 is a block diagram illustrating one embodiment of a cryptographic unit.

In some embodiments, one or more hash algorithms may be implemented within a cryptographic unit. One such embodiment of a cryptographic unit is illustrated in FIG. 4. In the illustrated embodiment, SPU 240 includes a hash word buffer 410 coupled to hash logic 420. In one embodiment, hash logic 420 may be configured to implement a plurality of different hash algorithms, such as the MD5, SHA-1 and SHA-256 algorithms, for example. Further, hash logic 420 may be configured to iteratively compute a hash value of a data block of a message according to one of the implemented hash algorithms. In some embodiments, hash word buffer 410 and hash logic 420 may be fabricated as a single integrated circuit, as may cores 100 and processor 10.

Hash word buffer 410 (or simply word buffer 410) may be configured to store a data block during hash value computation by hash logic 420. In one embodiment, as described in greater detail below in conjunction with the description of FIG. 5A, word buffer 410 may include a plurality of data word positions. In such an embodiment, a given data block may be stored as a plurality of data words within the corresponding data word positions. For example, in one embodiment a 512-bit data block may be stored as a plurality of 32-bit data words in a word buffer 410 having 16 data word positions. In some embodiments, word buffer 410 may include additional logic not shown, such as control logic configured to control the behavior of word buffer 410 during hash algorithm execution. In other embodiments, some or all such logic may be located externally to word buffer 410, for example in hash logic 420 or elsewhere within SPU 240.

As mentioned above, in some hash algorithm embodiments, a given data block may be iteratively processed in order to arrive at a hash value for that block. That is, computing a given hash value of a particular data block according to a given hash algorithm may include a plurality of iterations upon that data block. Also, in some hash algorithm embodiments, each iteration operates on one data word of the data block. For example, a hash algorithm may be configured to progress through the data words included in a data block in an order specified by the algorithm.

In some embodiments, during the course of iterating, the given data block undergoing processing may be transformed according to the hash algorithm. For example, in one version of the MD5 algorithm, a given 512-bit data block comprising 16 32-bit data words undergoes 64 iterations grouped into four rounds of sixteen iterations each. During round 1, the words of the data block are processed in their original order, at a rate of one data word per iteration. For subsequent rounds, the order in which data words are processed varies as follows:

| Round 1: | 00 | 01 | 02 | 03 | 04 | 05 | 06 | 07 | 08 | 09 | 10 | 11 | 12 | 13 | 14 | 15 |
|---|---|---|---|---|---|---|---|---|---|---|---|---|---|---|---|---|
| Round 2: | 01 | 06 | 11 | 00 | 05 | 10 | 15 | 04 | 09 | 14 | 03 | 08 | 13 | 02 | 07 | 12 |
| Round 3: | 05 | 08 | 11 | 14 | 01 | 04 | 07 | 10 | 13 | 00 | 03 | 06 | 09 | 12 | 15 | 02 |
| Round 4: | 00 | 07 | 14 | 05 | 12 | 03 | 10 | 01 | 08 | 15 | 06 | 13 | 04 | 11 | 02 | 09 |

That is, for round 1, the words of the data block are processed in their original order. For round 2, the first data word processed is the data word originally in position 01, and the position from which subsequent words are selected for processing is derived by adding 5 to the previous word, modulo 16. Similarly, for rounds 3 and 4, the first data word processed is the data word originally in position 05 and 00, respectively. For these rounds, the position from which subsequent words are selected for processing is derived by adding 3 and 7, respectively, to the previous word, modulo 16.

For other hash algorithms, the transformations applied to the data block during iteration may differ. For example, one version of the SHA-1 algorithm specifies 80 iterations per 16-word, 512-bit data block. For iterations 0 through 15 of SHA-1, the data words are processed in order, similar to round 1 of the MD5 algorithm shown above. For iterations 16 through 79, the data word W[k] for a given iteration k is given by:

$$W[k] = ROTL\_1(W[k-16]\,\hat{}\,W[k-14]\,\hat{}\,W[k-8]\,\hat{}\,W[k-3])$$

where ROTL_1(x) specifies a logical rotate left of x by 1 bit position, and where ˆ denotes a logical XOR operation. For example, the word processed during iteration 17 of the SHA-1 algorithm is given by the logical XOR of words 01, 03, 09 and 14, rotated left by 1 bit position. Unlike the MD5 algorithm, in which individual data words are reordered and reutilized by the hash algorithm as illustrated above, a given data word in SHA-1 is processed once. After a given data word has been processed, and after any subsequent data words dependent on the given data word have been determined (e.g., by the relation given above), the given data word may be discarded.

One version of the SHA-256 algorithm specifies 64 iterations per 16-word, 512-bit data block. Like SHA-1 and MD5, the data words are processed in order for iterations 0 through 15. For iterations 16 through 63, data words are determined dependent on previous words in a manner similar to SHA-1. For these iterations, the data word W[k] for a given iteration k is given by:

$$W[k] = ss\_1\_256(W[k-2]) + W[k-7] + ss\_0\_256(W[k-15]) + W[k-16]$$

where:

$$ss\_0\_256(x) = ROTR\_7(x)\,\hat{}\,ROTR\_18(x)\,\hat{}\,SHR\_3(x)$$

$$ss\_1\_256(x) = ROTR\_17(x)\,\hat{}\,ROTR\_19(x)\,\hat{}\,SHR\_10(x)$$

and where ROTR_n(x) and SHR_n(x) specify a logical rotate right and a logical shift right of x by n bit positions, respectively. Like SHA-1, in SHA-256, after a given data word has been processed, and after any subsequent data words dependent on the given data word have been determined, the given data word may be discarded.

In some embodiments, substantial implementation area may be conserved by efficiently configuring word buffer 410 to store data blocks during computing of several different hash algorithms by hash logic 420, rather than providing respective instances of word buffer 410 corresponding to each different hash algorithm. However, a conventional design in which each data word position of word buffer 410 is fixed and the hash algorithm iterates over data word positions in sequence may require additional multiplexer logic, which in turn increases implementation area. For example, in one such conventional embodiment, any of the data words of word buffer 410 may be an input to hash logic 420 during some iteration, such that a 16:1 multiplexer is required to select the next word to be processed by hash logic 420. Additionally, for the SHA-1 and SHA-256 algorithms described above, a next data word value for a given data word position depends on previous data word values, which may require additional 16:1 multiplexers to implement.

Figure 5A:
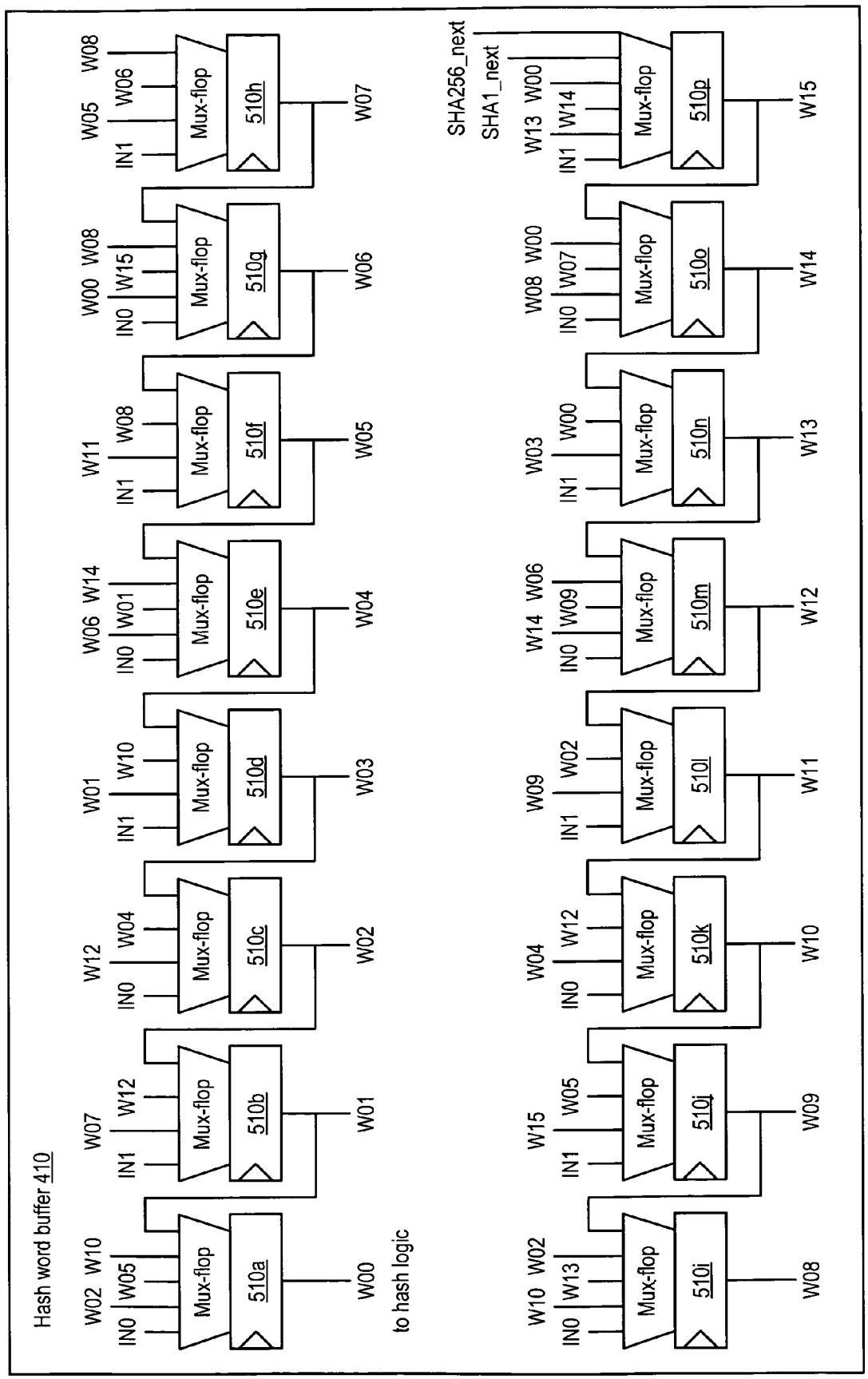
FIG. 5 is a block diagram illustrating one embodiment of a hash word buffer.

One alternative word buffer embodiment is illustrated in FIG. 5A. In the illustrated embodiment, hash word buffer 410 includes a plurality of mux-flops 510a-p corresponding respectively to sixteen data word positions W00 through W15. In one embodiment, each word position comprises 32 bits of storage for a total word buffer 410 capacity of 512 bits; however, in other embodiments it is contemplated that different numbers of data word positions and data word widths may be employed. For example, in one embodiment of word buffer 410 configured to support the SHA-384 and/or SHA-512 algorithms, 16 word positions each comprising 64 bits of storage may be employed. Each of mux-flops 510 includes a plurality of inputs. In the illustrated embodiment, one input of each of mux-flops 510*a-o* is coupled to the output of the respective adjacent mux-flop 510*b-p*. Other inputs of mux-flops 510*a-p* are coupled to the outputs of other, nonadjacent mux-flops 510 as shown. Additionally, mux-flop 510*p*, corresponding to data word position W15, includes the inputs SHA1_next and SHA256_next described in greater detail below.

Also, in the illustrated embodiment, each of mux-flops 510*a-p* is coupled to one of two input buses. Even-numbered word positions are coupled to input bus IN0, and odd-numbered word positions are coupled to input bus IN1. Input buses IN0 and 1N1 may be configured to provide input data to word buffer 410, for example to load word buffer 410 with a data block to be hashed. In the illustrated embodiment, input buses IN0 and IN1 may be configured to concurrently fill any two data word positions (not necessarily adjacent) of word buffer 410. In other embodiments, it is contemplated that fewer or more data word positions may be concurrently filled. For example, in some embodiment SPU 240 may include a 32-bit, 128-bit or another width of an input path to word buffer 410, which may enable concurrent filling of one, four or another number of data word positions.

Collectively, mux-flops 510 may be configured to provide persistent storage for word buffer data along with selective control over the next state of the word buffer data. In the illustrated embodiment, each mux-flop 510 is shown as a single structure including a multiplexer abutting a flip-flop or register. However, in other embodiments, any suitable logic structure may be employed. For example, in one embodiment the function of mux-flop 510 may be realized by implementing one or more discrete multiplexers coupled to a register element or a register file. Alternatively, in one embodiment a memory storage element such as a random access memory (RAM) cell may be used in place of a register, and the selective multiplexer functionality may be built into the RAM cell or implemented externally to it.

In one embodiment, rather than keeping the relative data word positions fixed and having hash logic 420 iterate across the data word positions as previously described, word buffer 410 may be configured to conditionally linearly shift the stored data block by one or more data word positions according to a dynamically selectable one of a plurality of hash algorithms. That is, in one embodiment word buffer 410 may be configured to support several different hash algorithms, such as MD5, SHA-1 and SHA-256 (although in other embodiments, different hash algorithms may be employed, including more or fewer algorithms). A particular algorithm may be dynamically selected from the plurality of supported hash algorithms, for example as one of several modes of operation of SPU 240 (e.g., MD5 mode, SHA-1 mode, SHA-256 mode, etc.).

After an iteration of the selected hash algorithm completes, in one embodiment word buffer 410 may be configured to linearly shift the stored data block by one data word position to the left. For example, word position W00 may be loaded into word position W00, word position W02 may be loaded into word position W01, etc. In the illustrated embodiment, the output of word position W00 is coupled to provide an input data word hash logic 420. By linearly shifting the stored data block following each iteration, the input data word to hash logic 420 may be taken from a fixed data word position (e.g., W00), in contrast to an embodiment that keeps the stored data block in fixed data word positions and configures hash logic 420 to select its input data word from a variable data word position (e.g., by using a 16:1 multiplexer as previously described).

Figure 6:
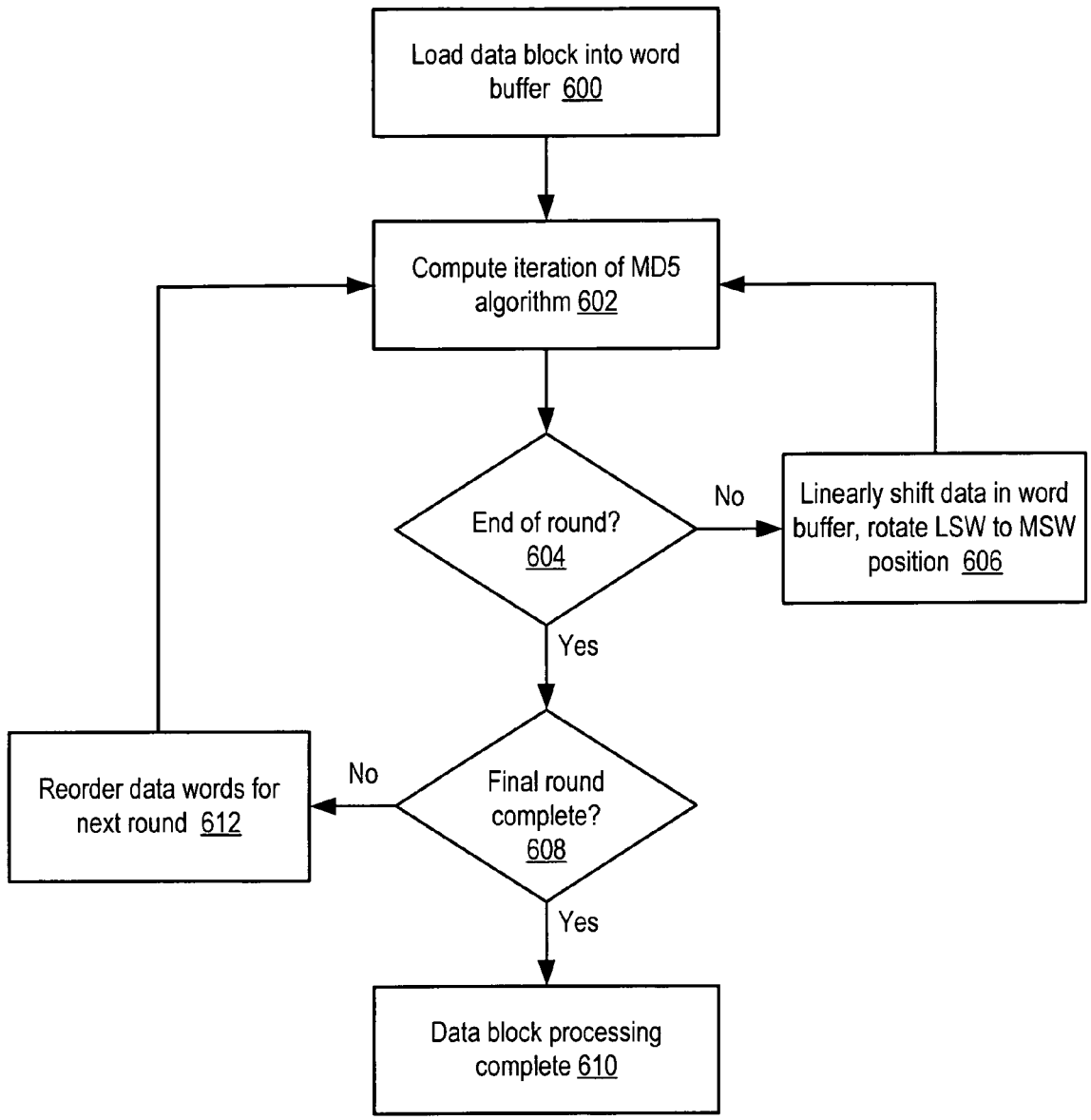
FIG. 6 is a flow diagram illustrating one embodiment of operation of a word buffer during a mode of operation corresponding to the Message Digest 5 (MD5) algorithm.

As noted above, in one embodiment the linear shift behavior of word buffer 410 may correspond to the selected hash algorithm. One embodiment of a method of shift operation of word buffer 410 during a mode of operation corresponding to the MD5 algorithm is illustrated in FIG. 6. Referring collectively to FIG. 1 through FIG. 6, operation begins in block 600 where a data block to be hashed is loaded into word buffer 410. For example, the data block may be loaded via the IN0/IN1 input buses as described above. Subsequently, an iteration of the MD5 algorithm may be computed, for example by hash logic 420, using the data word position W00 as the input to the iteration (block 602).

After the iteration is computed, it is determined whether the completed iteration marks the end of a round (block 604). As noted above, in one embodiment the MD5 algorithm includes 64 iterations divided into four rounds of 16 iterations. If the completed iteration does not mark the end of a round, in one embodiment the data block may be linearly shifted one data word position to the left, and a data word linearly shifted out of a least significant data word (LSW) position may be'rotated into a most significant data word (MSW) position (block 606). For example, the data word shifted out of data word position W00 may be rotated into data word position W15 via the "W00" input to mux-flop 510*p*. After the shift and rotate, execution may proceed from block 602 where another iteration is computed.

Returning to block 604, if the completed iteration does mark the end of a round, it is determined whether the final round has been completed (block 608). (In some embodiments, this step may be performed along with the end-of-round check performed in block 604.) If so, then MD5 processing of the current data block is complete (block 610). If not, then the data words are reordered as required for the next round of processing (block 612), for example according to the four MD5 round orderings shown above. Following data word reordering, execution may proceed from block 602 where another iteration is computed.

In one embodiment of word buffer 410 operating in an MD5 mode of operation as just described, the 16 iterations of a round may result in 15 linear shift/rotate operations followed by a reordering operation. As shown in the embodiment of FIG. 5A, the linear shift operations may be effected by the coupling of each mux-flop 510 to the next least significant data word position, and by the coupling of the output of the LSW position (W00) to the input of the MSW position (W15). The end-of-round reordering operation may be effected by the coupling of other data word positions to the various mux-flops 510 as follows. At the end of the first round of MD5 processing, just prior to reordering, 15 shift/rotate operations may have occurred, such that original data word 15 is in the W00 position, original data word 0 is in the W01 position, etc. As indicated above, at the beginning of MD5 round 2, original data word 1 is expected to be in the W00 position, but at the end of round 1, it may be in the W02 position. Thus, if mux-flop 510*a* is configured to select its W02 input during reordering at the end of the first round, original data word 1 will be ordered in the proper position for round 2. The end-of-round positions and desired positions after reordering may be similarly determined for other data words and other rounds.

In one embodiment, the shift operation of word buffer 410 following an iteration of the SHA-1 or SHA-256 algorithm may differ from that described above for the MD5 algorithm.

As described previously, rather than recycling existing word buffer values for successive iterations as in the MD5 algorithm, the SHA-1 and SHA-256 algorithms provide a formula for determining a next word buffer entry from previous word buffer entries.

Figure 7:
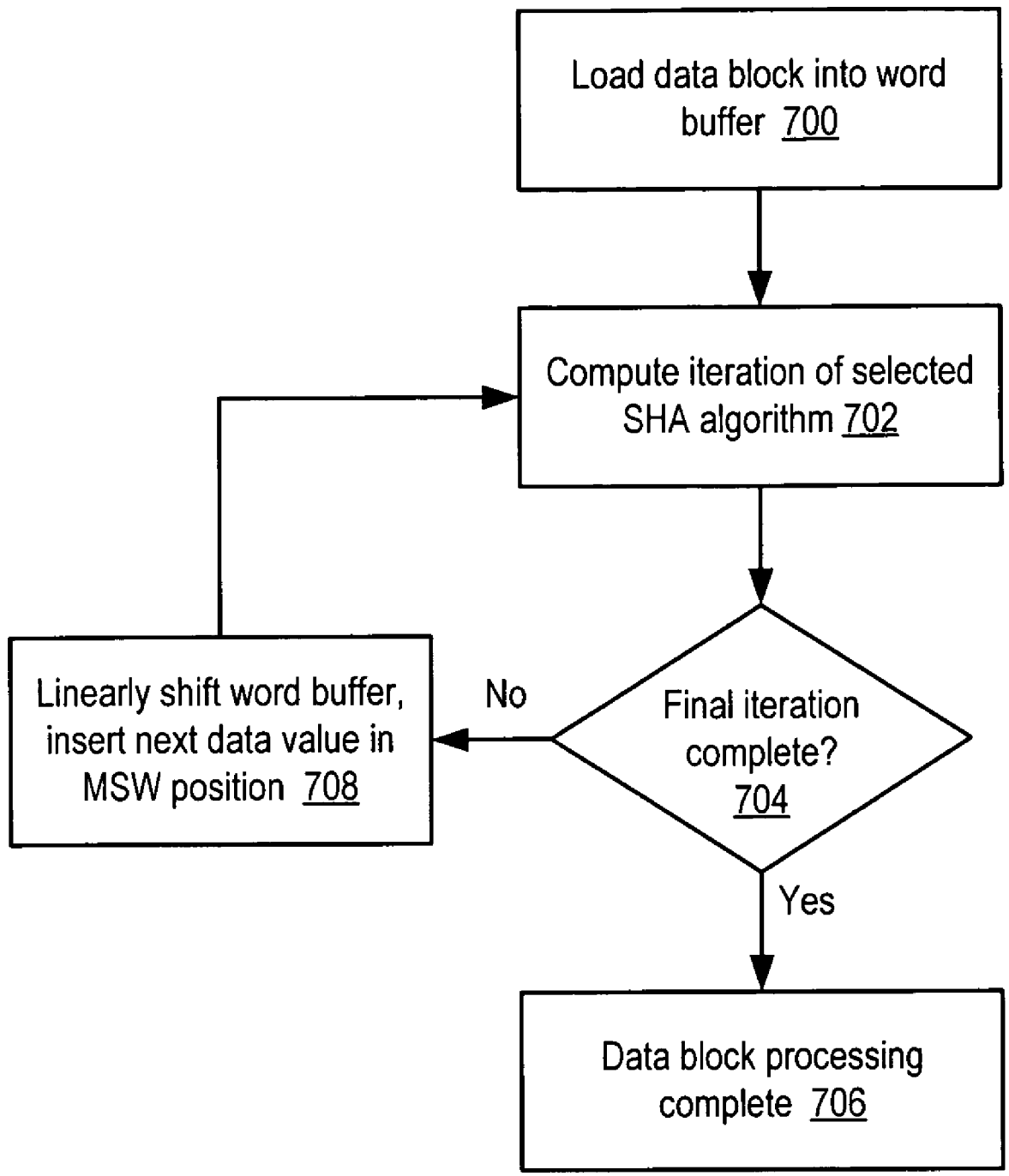
FIG. 7 is a flow diagram illustrating one embodiment of operation of a word buffer during a mode of operation corresponding to the Secure Hash Algorithm SHA-1 and SHA-256 algorithms.

One embodiment of a method of shift operation of word buffer 410 during a mode of operation corresponding to the SHA-1 and SHA-256 algorithms is illustrated in FIG. 7. Referring collectively to FIG. 1 through FIG. 5A and FIG. 7, operation begins in block 700 where a data block to be hashed according to a dynamically selected one of the SHA-1/SHA-256 algorithms is loaded into word buffer 410. For example, the data block may be loaded via the IN0/IN1 input buses as described above. Subsequently, an iteration of the selected algorithm may be computed, for example by hash logic 420, using the data word position W00 as the input to the iteration (block 702).

After the iteration is computed, it is determined whether the computed iteration was the final iteration (block 704). If so, processing of the current data block is complete (block 706). Otherwise, the data block may be linearly shifted one data word position to the left and a next data value may be inserted into the MSW position (block 708). In one embodiment, the data word shifted out of the LSW position of word buffer 410 (i.e., W00) as a result of the linear shift may be discarded, and the data shifted into the MSW position (i.e., W15) as a result of the linear shift may be determined according to the selected hash algorithm, as described in greater detail below in conjunction with the description of FIG. 8. In the embodiment of word buffer 410 illustrated in FIG. 5A, the value shifted into the MSW position for the SHA-1 and SHA-256 algorithms are denoted "SHA1_next" and "SHA256_next," respectively.

Following linear shifting of word buffer 410 and appropriate MSW value selection and insertion, operation may continue from block 702 where another iteration of the algorithm is computed. It is noted that in some embodiments, determination of the next MSW data word value to be inserted during word buffer shifting may occur concurrently with computation of an iteration of the selected algorithm.

The relations to determine the next data word value to insert for the SHA-1 and SHA-256 algorithms were given above, parameterized in terms of the iteration count. However, it is observed that in the word buffer 410 embodiment illustrated in FIG. 5A, the next word buffer entry is always inserted into the MSW position (W15) and therefore has an effective data word position of 16 prior to insertion. That is, for any given iteration t, the data word corresponding to iteration t occupies data word position W00, the data word corresponding to iteration t+1 occupies data word position W01, and so on, such that the data word corresponding to iteration t+15 occupies data word position W15, and the data word corresponding to iteration t+16 will occupy data word position W15 following a shift of word buffer 410. Since the data block shifts following each iteration in the illustrated embodiment, the next data value to insert is a function of the same data word positions of word buffer 410, as opposed to a fixed data word position implementation in which the next data value to insert may be a function of different data word positions for different iteration. For the word buffer 410 embodiment illustrated in FIG. 5A, the SHA-1 next value relation simplifies to:

$$W[16]=ROTL\_11(W[00]\char`\^W[02]\char`\^[08]\char`\^W[13])$$

and the SHA-256 next value relation simplifies to:

$$W[16]=ss\_1\_256(W[14])+W[09]+ss\_0\_256(W[01])+W[00]$$

where ss_0_256 and ss_1_256 are defined as given above.

Figure 8:
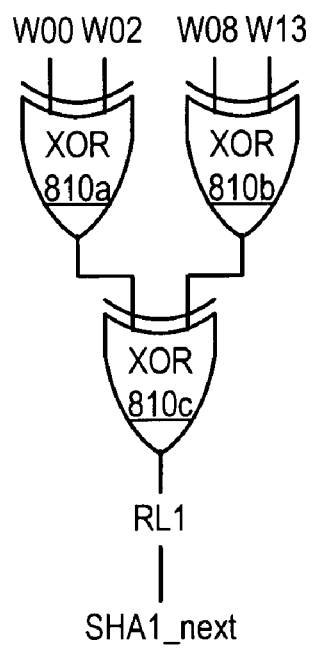
FIG. 8 is a logic diagram illustrating one embodiment of SHA-1/SHA-256 next value logic.
Figure 8:
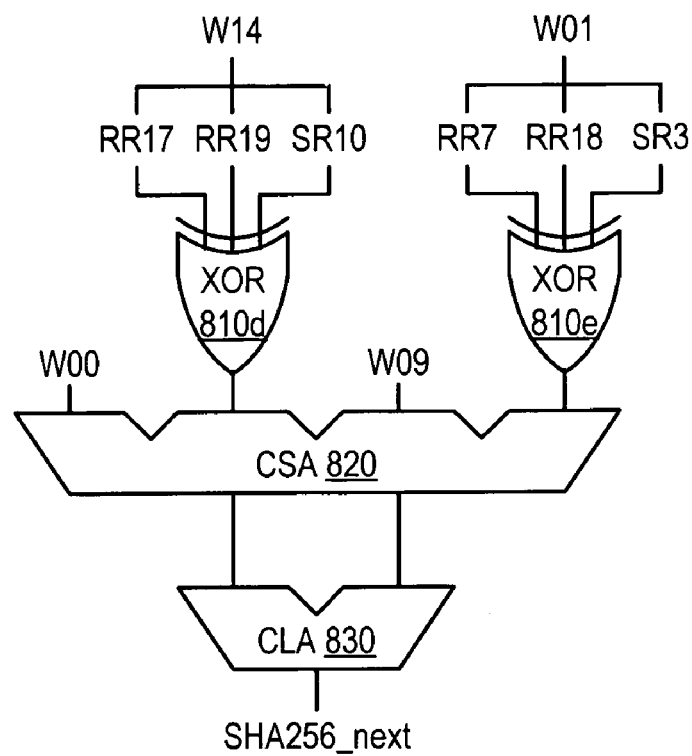

One embodiment of logic configured to implement these next value relations is illustrated in FIG. 8. In the illustrated embodiment, the SHA-1 next value relation just given is implemented as a two-level XOR function using XOR gates 810a-c. The output of XOR gate 810c is rotated left by one bit position (RL1) to produce the SHA1_next value that forms one input to mux-flop 510p of word buffer 410.

The SHA-256 next value relation is implemented using several levels of logic in the illustrated embodiment. The ss_0_256(W01) function is implemented by separately rotating W01 right by 7 and 18 bit positions (RR7, RR18) as well as logically shifting W01 right by 3 bit positions (SR3), and by combining these three values in XOR gate 810e. Similarly, the ss_1_256(W14) function is implemented by separately rotating W14 right by 17 and 19 bit positions (RR17, RR19) as well as logically shifting W14 right by 10 bit positions (SR10), and by combining these three values in XOR gate 810d. Subsequently, the outputs of XOR gates 810d-e are accumulated along with W00 and W09 in 4:2 carry save adder (CSA) 820 to produce a sum and a carry term, which are then added in carry lookahead adder (CLA) 830 to produce the SHA256_next value that forms one input to mux-flop 510p of word buffer 410.

Numerous other varying implementations of the SHA1_next and SHA256_next functions are possible and contemplated. For example, XOR gates with differing numbers of inputs, or other types of gates that provide equivalent functionality may be employed. Different types of adders may also be used to implement the summation function of SHA256_next. In some embodiments, a shift or rotate function by a fixed number of bits, such as any of the shifts or rotates used in the next value function, may be implemented by simply hardwiring the input bits to the specified output bit ordering; in such embodiments, no active logic may be necessary to perform these shift and rotate functions.

Each of the hash algorithms described above iterates a specific number of times on a data block, and word buffer 410 may be configured to linearly shift the data block dependent on the hash algorithm that is executing. As iterations and corresponding word buffer shifting progress, in one embodiment a linear shift of word buffer 410 may result in the most significant data word position becoming vacant. For example, the SHA-1 algorithm may be configured to iterate 80 times (numbered 0 to 79) on a given data block. At the beginning of iteration 64, the SHA1_next value for iteration 79 may have already been determined and shifted into data word position W15. Following iteration 64, word buffer 410 may be linearly shifted as described above until the value for iteration 79 occupies data word position W00. However, these shifts may result in data word positions from W15 to W01 becoming vacant, as no further data values beyond iteration 79 are required.

In some instances, a given message to be hashed may include more than one data block. Requiring word buffer 410 to completely drain a previous data block through shifting may increase hashing latency in this case. However, in one embodiment, in response to data word positions becoming vacant, word buffer 410 may be configured to shift in data words of a new data block. For example, referring to the SHA-1 case just described, if a new data block is available, then the least significant data word of the new data block may be linearly shifted into the most significant word position of word buffer 410 as soon as the first shift after the SHA1_next value for iteration 79 of the previous data block. Thus, in one embodiment, there may be no delay between processing of consecutive data blocks, and at some points in time, word buffer 410 may include data words corresponding to different data blocks.

Providing zero delay between processing of consecutive data blocks may not be possible in every instance. For example, the next data block to process may not have been received by SPU 240 at the time the value corresponding to the last iteration of a given data block has been shifted into word buffer 410. Consequently, several vacant word positions may exist at the time the next data block arrives. However, in the illustrated embodiment, it is not necessary to insert the new data block values into word buffer 410 at the most significant data word position. In the illustrated embodiment, if less significant data word positions are vacant, word buffer 410 may be configured to load new data block words directly into the vacant positions, for example by directly accessing the IN0/IN1 input port of the corresponding mux-flop 510. Since in one embodiment, word buffer 410 load bandwidth exceeds the rate at which words are shifted (i.e., two data words may be loaded during a single execution cycle, whereas one data word shift may occur per iteration, which iteration may require more than one execution cycle in some embodiments), it may be possible to reduce or eliminate vacant data word positions between data blocks, which may increase overall hash algorithm performance.

Figure 9:
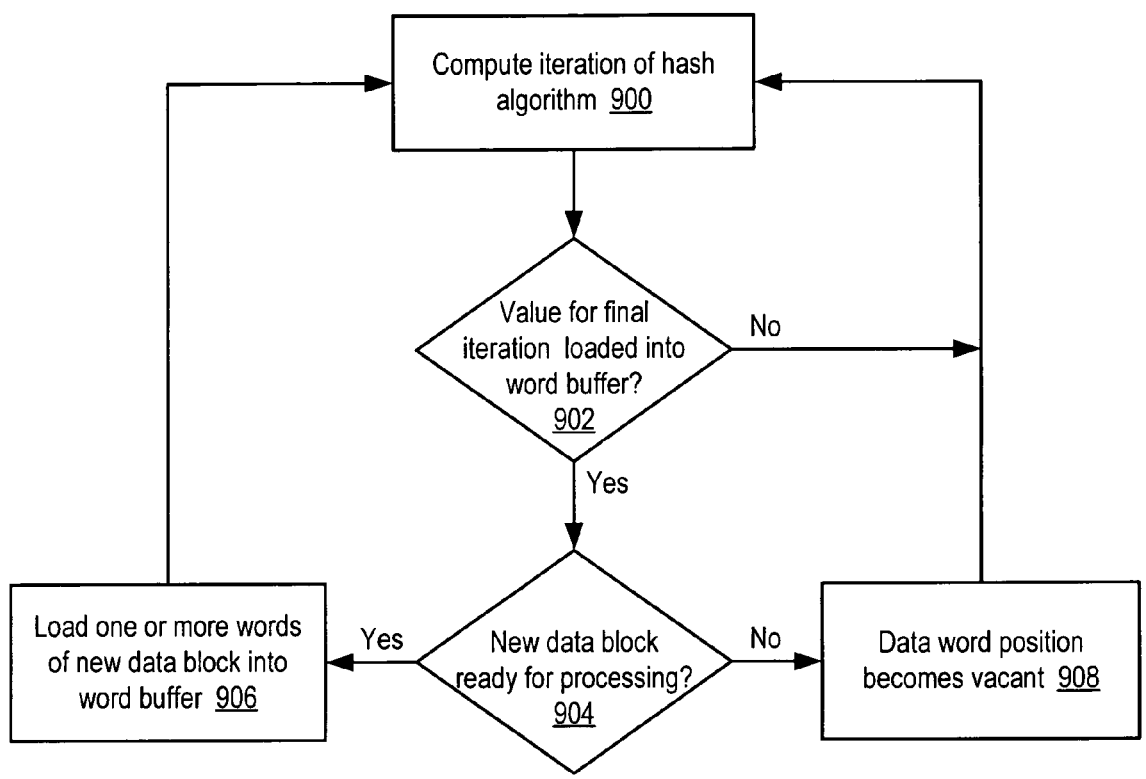
FIG. 9 is a flow diagram illustrating one embodiment of a method of filling a word buffer.

One embodiment of a method of filling word buffer 410 is illustrated in FIG. 9. Referring collectively to FIG. 1 through FIG. 5A and FIG. 9, operation begins in block 900 where an iteration of a hash algorithm on a data block is computed. Subsequently, it is determined whether the word buffer value for the final iteration of the hash algorithm has already been loaded into word buffer 410 (block 902). (In some embodiments, this may be determined by inspecting the value of the current iteration, as described above.) If not, execution proceeds from block 900 where another iteration is performed.

If the word buffer value for the final iteration has already been loaded into word buffer 410, then it is determined whether a new data block is ready for processing (block 904). If so, then one or more words of the new data block are loaded into word buffer 410 (block 906). For example, a least significant word of the new data block may be linearly shifted into the most significant data word position of word buffer 410, or multiple words of the new data block may be loaded into vacant data word positions of word buffer 410. If no new data block is ready, a data word position becomes vacant (block 908). Subsequent to either a data word position becoming vacant or being loaded with data from the new data block, execution proceeds from block 900 where another iteration is computed.

Figure 10:
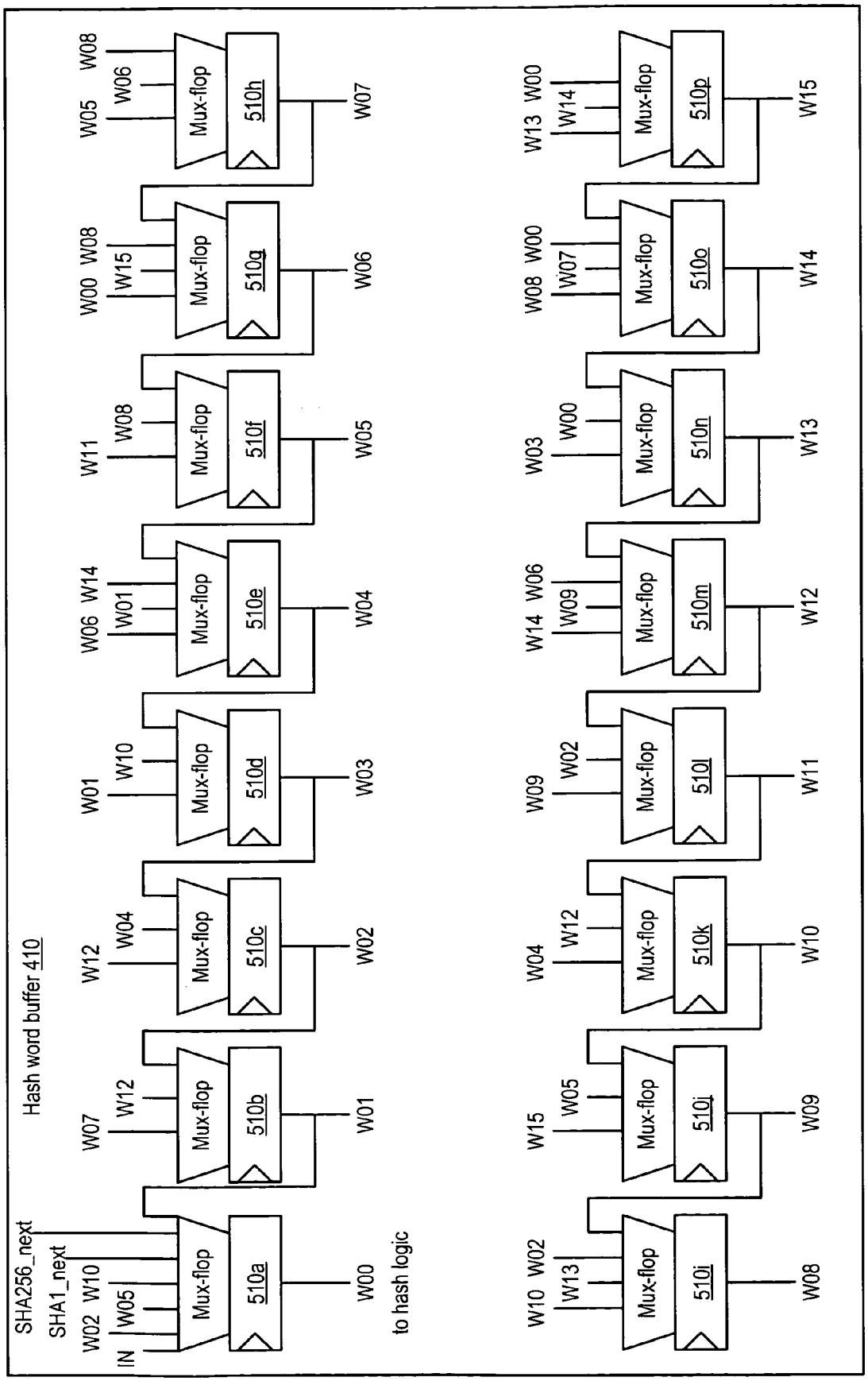
FIG. 10 is a block diagram illustrating another embodiment of a hash word buffer.

Other configurations of word buffer 410 are possible and contemplated. One alternative embodiment of word buffer 410 is illustrated in FIG. 10. In the illustrated embodiment, mux-flops 510a-p are coupled similarly to the embodiment of FIG. 5, with the exception that the SHA1_next and SHA256_next input values and a single input bus IN are coupled to mux-flop 510a (word position W00). In the illustrated embodiment, rather than filling each individual data word position with a corresponding data block word, individual data block words may be inserted into word position W00 and rotated through word position W15 as appropriate. For example, during cycle 0 of a given MD5 iteration, word 0 of the data block to be hashed may be loaded into mux-flop 510a via the IN bus. During the next cycle, word 0 may be conveyed to hash logic 420 and rotated to mux-flop 510p, and word 1 of the data block may be loaded into mux-flop 510a. Once word 15 of the data block has been loaded into mux-flop 510a, words 0-14 may occupy mux-flops 510b-p, respectively. During MD5 execution, reordering of word buffer 410 may occur after the sixteen data words are processed, while during SHA-1/SHA-256 execution, additional data words may be computed and loaded into mux-flop 510a via the SHA1_next/SHA256_next paths in a manner similar to that described above for the embodiment illustrated in FIG. 5. However, in the embodiment illustrated in FIG. 10, fewer input buses may be required, as both word buffer filling and data consumption occur from the least significant data word position.

Also, in some embodiments it is contemplated that data may not be consumed from word buffer 410 at the same rate that word buffer 410 may be filled. For example, as described below, in some embodiments hash logic 420 may be configured to compute an iteration of a hash algorithm over the course of two execution cycles, retrieving a data word from word buffer 410 every other execution cycle. Additionally, in some embodiments hash execution may stall for other reasons, for example due to a failure to receive operand data from sources external to SPU 240 due to interface congestion. Consequently, in some embodiments word buffer 410 may include support for retaining its data during stall conditions and for appropriately synchronizing its fill and shift behavior with the rate of data consumption of hash logic 420. For example, in one embodiment each of mux-flops 510a-p may utilize a gated clock, such that a given mux-flop 510 may load a new value only when its clock input is qualified with an asserted enable signal, which may be supplied by control logic within SPU 240. In another embodiment, the output of each mux-flop 510 may be coupled as an input to that mux-flop 510, so that each mux-flop 510 may be configured to reload its previous value if a stall condition should occur.

Further, in some embodiments differing data fill and consumption rates may be balanced by staging the output of each of mux-flops 510 through an additional flip-flop. For example, in one embodiment where hash logic 420 consumes a data word value every other execution cycle, the outputs of each of mux-flops 510a-p may be coupled to a respective additional flip-flop. Stall support may be provided by coupling the output of the additional flip-flop to the input of its associated mux-flop 510, and hash logic 420 may be coupled to receive its input from the output of the flip-flop coupled to mux-flop 510a. However, it is contemplated that any suitable means of providing stall support and data rate synchronization may be employed, such as by using clock gating or clock division, for example.

Although the foregoing discussion refers specifically to the MD5, SHA-1 and SHA-256 hash algorithms, it is contemplated that in other embodiments, the techniques and methods described above may be applied to any suitable hash algorithm, such as the SHA-384 and SHA-512 hash algorithms, for example.

Hash Logic

As noted above, in some embodiments hash logic 420 may be configured to compute a hash value of a data block according to any of several different hash algorithms. However, implementing each supported hash algorithm using separate logic resources dedicated to each algorithm may require substantial die area. Further, in embodiments of SPU 240 where only one of several hash algorithms may execute at a given time, logic resources dedicated to other hash algorithms may be idle and thus unproductive.

Figure 11:
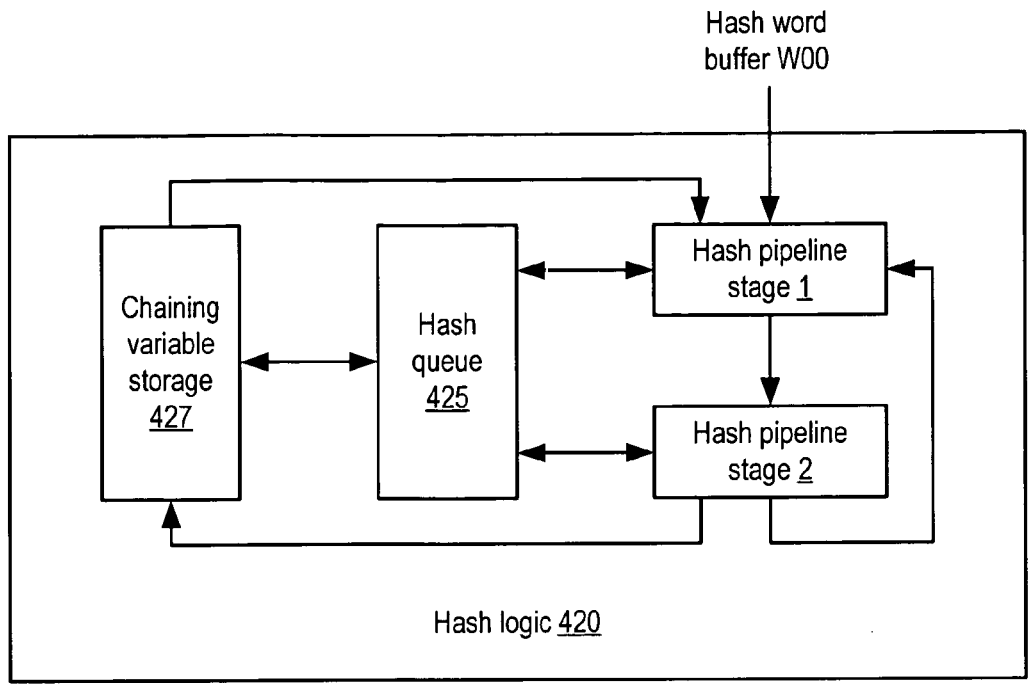
FIG. 11 is a block diagram illustrating one embodiment of hash logic configured to compute a hash value of a data block.

One embodiment of hash logic 420 configured to compute a hash value of a data block according to a hash algorithm, where the hash algorithm may be dynamically selected from a plurality of hash algorithms, is illustrated in FIG. 11. In the illustrated embodiment, hash logic 420 includes a plurality of hash pipeline stages 1 and 2, each of which is coupled to a hash queue 425. Hash pipeline stages 1 and 2 (which may also be referred to simply as stages 1 and 2) are coupled to each other. Additionally, in the illustrated embodiment, stage 1 is coupled to receive a value from hash word buffer 410, position W00. However, in other embodiments, hash logic 420 may be configured to receive an input from any data word position of a word buffer, such as in the case of a word buffer whose data contents do not shift between hash algorithm iterations. Finally, in the illustrated embodiment hash logic 420 also includes chaining variable storage 427, which is coupled to hash queue 425 as well as stages 1 and 2.

A particular hash algorithm may be dynamically selected from the plurality of supported hash algorithms, for example as one of several modes of operation of SPU 240 or hash logic 420. For example, in one embodiment hash logic 420 may be configured to implement the MD5 hash algorithm as well as the SHA-1 and SHA-256 algorithms, each as distinct modes of operation that may be selected during the operation of SPU 240. In some embodiments, hash logic 420 may be hardwired to compute each supported hash algorithm. That is, hash logic 420 may be configured to compute each supported hash function without relying on software external to hash logic 420 to control computation.

Figure 12:
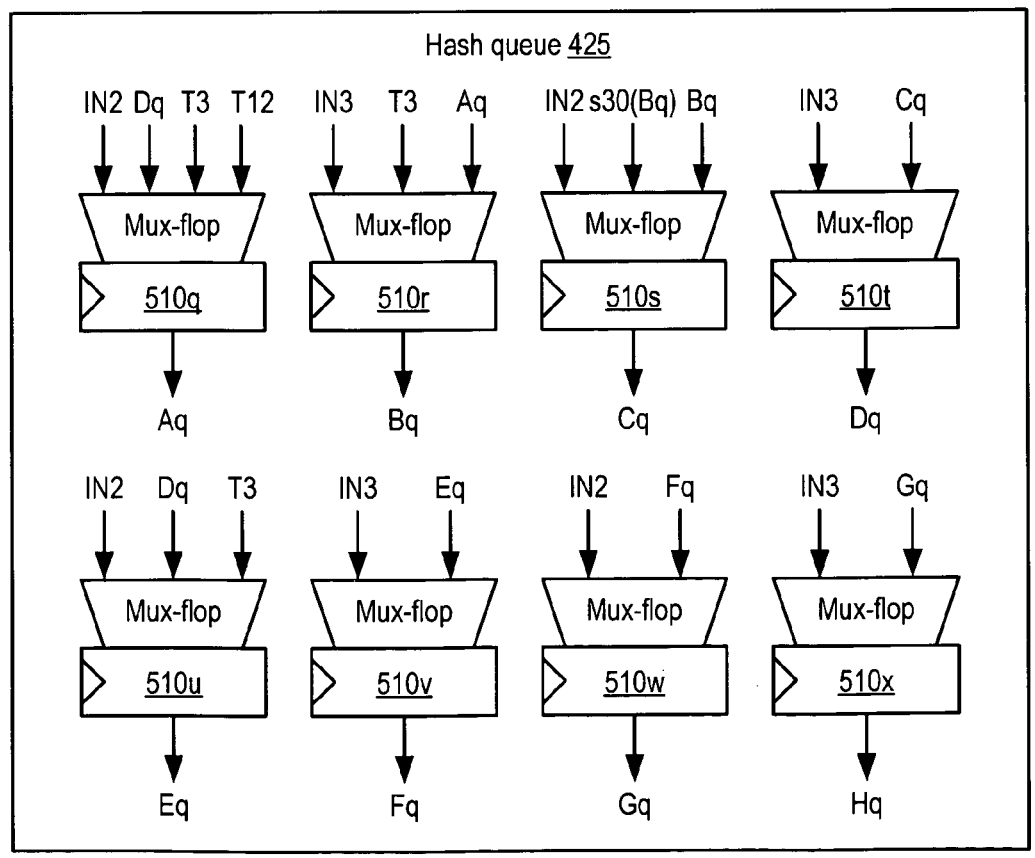
FIG. 12 is a block diagram illustrating one embodiment of a hash queue configured to store a hash value.

In some embodiments, hash queue 425 may be configured to provide storage for a hash value of a given data block as it is computed. For example, many hash algorithms are configured to produce hash values iteratively, with a given iteration depending on a previously determined intermediate hash value as well as some portion of the data word being hashed. One embodiment of hash queue 425 is illustrated in FIG. 12. In the illustrated embodiment, hash logic 425 includes a plurality of mux-flops 510q-x that correspond respectively to hash word positions designated Aq through Hq.

Each of mux-flops 510q-x may be illustrative of mux-flops 510 used in word buffer 410 shown in FIG. 5A and described above. As previously noted, in other embodiments any suitable combination of data selecting and data storage elements may be used in place of mux-flops 510. In the illustrated embodiment, each of mux-flops 510q-x may be configured to store a single 32-bit word of the hash value being computed. However, not all hash value word positions may be used during execution of a given hash algorithm. For example, in one embodiment, words Aq through Dq are used during MD5 execution to store a 128-bit hash value, words Aq through Eq are used during SHA-1 execution to store a 160-bit hash value, and words Aq through Hq are used during SHA-256 execution to store a 256-bit hash value. In other embodiments it is contemplated that hash queue 425 may implement more or fewer than eight hash value word positions, and that each word position may correspond to other than 32 bits. For example, in an embodiment configured to support the SHA-384 and/or SHA-512 algorithms, hash queue 425 may include 64-bit word positions.

Also, in the illustrated embodiment, each of mux-flops 510q-x is coupled to one of two input buses, in a manner similar to that described above for hash buffer 410. Hash word positions Aq, Cq, Eq and Gq are coupled to input bus IN2, while the remaining word positions are coupled to input bus IN3. Input buses IN2 and IN3 may be configured to provide input data to hash queue 425, for example to load hash queue 425 with an initial hash value before beginning hash value computation, or to load an intermediate hash value if a previous hash computation is resuming (e.g. after an interruption). In the illustrated embodiment, input buses IN2 and IN3 may be configured to concurrently fill any two hash value word positions (not necessarily adjacent) of hash queue 425. In other embodiments, it is contemplated that fewer or more hash value word positions may be concurrently filled. For example, in some embodiments SPU 240 may include a 32-bit, 128-bit or another width of an input path to hash logic 420, which may enable concurrent filling of one, four or another number of hash value word positions.

Many of mux-flops 510q-x are coupled to receive as inputs the outputs of other mux-flops 510q-x, as shown in FIG. 12. Additionally, some of mux-flops 510q-x are coupled to receive as inputs various outputs of pipeline stages 1 and 2, shown in FIG. 13 and described below. In the illustrated embodiment, mux-flop 510s is coupled to receive as an input the value denoted s30(Bq). As used herein, the notation sN(X) represents a logical rotate left of the value X by N bits. In many embodiments, if the rotate count N of a particular rotate function is fixed, the logical rotation may be implemented by simply reordering the arrangement of bits of the operand without employing active logic such as multiplexers or logic gates.

Figure 13:
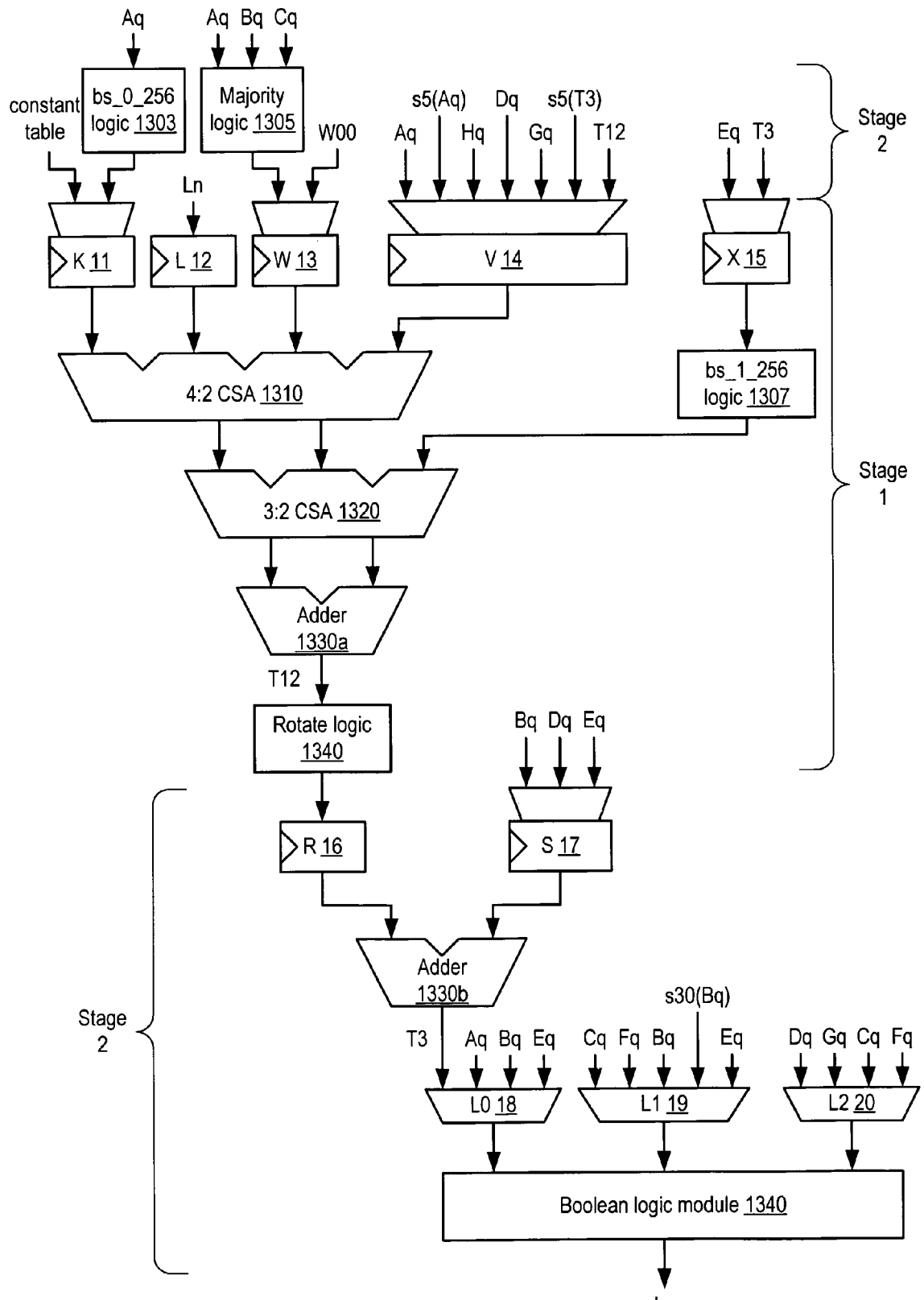
FIG. 13 is a block diagram illustrating one embodiment of hash pipeline logic.

One embodiment of logic included in pipeline stages 1 and 2 is illustrated in FIG. 13. In the illustrated embodiment, stage 1 comprises a mux-flop K 11, a flip-flop or register L 12, a mux-flop W 13, and a mux-flop V 14, each of which is coupled to a respective input of 4:2 carry save adder (CSA) 1310. Mux-flop K 11 is coupled to receive inputs from a constant table (not shown) as well as from bs_0_256 logic 1303, which in turn receives as an input the value Aq from hash queue 425. Register L 12 is coupled to receive the value Ln produced by Boolean logic module 1340 described below. Mux-flop W 13 is coupled to receive inputs from word buffer data position W00 as well as from majority logic 1305, which is in turn coupled to receive inputs Aq, Bq and Cq from hash queue 425. Mux-flop V 14 is coupled to receive inputs Aq, Hq, Dq and Gq from hash queue 425 as well as the functions s5(Aq), the sum output T12 of adder 1330a, and the function s5(T3) of the output T3 of adder 1330b. In the illustrated embodiment, bs_0_256 logic 1303 and majority logic 1305 may be nominally included as part of stage 2 as described in greater detail below.

Stage 1 further comprises a mux-flop X 15 coupled to receive input Eq from hash queue 425 as well as the output T3 of adder 1330b described below. The output of mux-flop X 15 is coupled to bs_1_256 logic 1307, which is in turn coupled to a 3:2 CSA 1320 along with the sum and carry outputs produced by 4:2 CSA 1310. The sum and carry outputs of 3:2 CSA 1320 are coupled to adder 1330a, the sum output of which is denoted T12 and coupled to rotate logic 1340 as well as mux-flop V 14 and mux-flop 510q of hash queue 425.

Stage 2 comprises a register R 16 coupled to receive the output of rotate logic 1340 and a mux-flop S 17 coupled to receive inputs Bq, Dq and Eq from hash queue 425. The outputs of R 16 and S 17 are summed in adder 1330b, the sum output of which is denoted T3 and coupled to multiplexer L0 18 as well as mux-flop X 15 and mux-flops 510q, r and u of hash queue 425. Multiplexer L0 18 is also coupled to receive inputs Aq, Bq and Eq from hash queue 425. Stage 2 further comprises multiplexer L1 19, coupled to receive inputs Cq, Fq, Bq and Eq from hash queue 425, as well as the function s20(Bq), and multiplexer L2 20, coupled to receive inputs Dq, Gq, Cq and Fq from hash queue 425. The outputs of each of multiplexers L0 18, L1 19 and L2 20 are coupled to Boolean logic module 1340, which in turn couples to register L 12.

In one embodiment, each of the mux-flops shown within stages 1 and 2 may be illustrative of mux-flops 510 of FIG. 5A and FIG. 12, although as described above, any suitable combination of circuits providing data selectivity and storage functions may be employed. In some embodiments, it is contemplated that latches may be used in place of flip-flops/registers in either mux-flops 510 or standalone register elements. Bs_0_256 logic 1303, majority logic 1305 and bs_1_256 logic 1307 are described in greater detail below in conjunction with the description of FIG. 14C (illustrating execution of the SHA-256 hash algorithm).

4:2 CSA 1310 and 3:2 CSA 1320 may be configured in one embodiment to reduce the specified number of input quantities (e.g., 4 or 3 32-bit quantities, respectively) to the specified number of output quantities, (e.g., a sum and a carry output). The sum and carry produced by 3:2 CSA 1320 may then be reduced to a single sum quantity by adder 1330a. In some embodiments, hash algorithm arithmetic may be performed modulo 32 bits, such that any carries out of CSAs 1310 and 1320 or adders 1330a-b may be discarded. In one embodiment, adders 1330a-b may be implemented as fast carry lookahead adders, although any suitable adder architecture may be employed. Further, in other embodiments, any suitable combination of adders and CSAs configurable to add five distinct input operands to produce a single result may be employed. For example, in some embodiments CSAs 1310 and 1320 may be replaced by fast adders or other styles or radixes of CSA logic.

In the illustrated embodiment, Boolean logic module 1340 may be configured to implement various Boolean functions of the specified input variables according to the executing hash algorithm. In one embodiment, Boolean logic module 1340 may be configured to selectively generate any Boolean function of three input variables, for example by generating each of eight possible minterms of three variables using AND-type logic and then selecting the minterms appropriate to the desired function using OR-type logic. However, in other embodiments Boolean logic module 1340 may be configured to use other types of logic structures or techniques to generate Boolean functions of three variables, or may be configured to generate only those Boolean functions actually required by the implemented hash algorithms.

It is noted that in various embodiments, the boundary between stage 1 and stage 2 may differ. In the illustrated embodiment, the stage boundary is marked beginning at the inputs to a set of pipeline registers (e.g., R 16 and S 17 for stage 2, or K 11, L 12, W 13, V 14 and X 15 for stage 1) and a given stage encompasses all logic downstream from those pipeline registers until the next pipeline register inputs are encountered. In other embodiments, a given pipeline stage may be marked from the outputs of pipeline registers, or from a different reference point. Further, it is contemplated that in other embodiments, certain logic elements may be relocated to different pipeline stages, for example to facilitate balancing the speed paths through each pipeline stage. For example, in one embodiment 4:2 CSA 1310 may be located prior to, rather than immediately following the stage 1 pipeline registers. (In such an embodiment, mux-flops K 11, W 13 and V 14 may be decomposed into separate multiplexers and registers to facilitate the relocation of CSA 1310 between the multiplexers and the registers.) Additionally, in some embodiments stage 1 and stage 2 may be implemented as a single pipeline stage (i.e., without being separated by pipeline registers or other timing elements). In such embodiments, stage 1 and stage 2 may denote functional stages rather than discrete pipeline stages.

In one embodiment, stages 1 and 2 of hash logic 420 may be configured to implement the MD5 hash algorithm and the SHA-1 and SHA-256 hash algorithms in respective modes of operation, although in other embodiments it is contemplated that stages 1 and 2 may be configured to implement other hash algorithms in addition to or instead of the aforementioned algorithms. In one embodiment, stages 1 and 2 may be configured by control logic included within hash logic 420, or elsewhere within SPU 240, that may select the multiplexer and mux-flop inputs appropriate to a particular hash algorithm during various execution cycles. Operation of one embodiment of stages 1 and 2 during execution of the MD5, SHA-1 and SHA-256 hash algorithms is illustrated in FIGS. 14A-C, respectively.

In one embodiment of the MD5 algorithm, for a single data block, a 128-bit (4 word) hash value is manipulated during the course of four rounds comprising 16 iterative) steps each, for a total of 64 iterations per data block. During a given iteration, the next hash value may be determined as a function of the current hash value and other inputs as follows:

$An=Dq;$ $Bn=Bq+ROTL\_s(Aq+L(Bq,Cq,Dq)+W[k]+K[i]);$ $Cn=Bq;$ $Dn=Cq;$ where Aq through Dq denote the current hash value as stored in hash queue 425, and ROTL_s(X) denotes a circular left rotate of X by s bit positions, where s varies according to the iteration and round being executed. Additionally, L(Bq,Cq,Dq) denotes a logical function of three variables that varies according to the round being executed as follows:

| | |
|---|---|
| L(Bq,Cq,Dq) = (Bq & Cq) \| (~Bq & Dg); | Round 1 |
| L(Bq,Cq,Dq) = (Bq & Dq) \| (Cq & ~Dq); | Round 2 |
| L(Bq,Cq,Dq) = Bq ^ Cq ^ Dq; | Round 3 |
| L(Bq,Cq,Dq) = Cq ^ (Bq \| ~Dq); | Round 4 |

Further, W[k] denotes one of the 16 32-bit words comprising the 512-bit data block being hashed, where the word selected varies according to the iteration and round being executed, and K[i] denotes an additive constant specific to the iteration being executed. (It is noted that in some embodiments, the next word W required by hash logic 420 may be determined by word buffer 410 and conveyed via a fixed word position such as W00, while in other embodiments hash logic 420 may be configured to directly select the appropriate word from a variable word position of the word buffer.)

Referring collectively to FIG. 13 and FIG. 14A, in one embodiment stages 1 and 2 may be configured to execute the MD5 hash algorithm described above as follows. As shown above, the four-input addition prior to the ROTL_s( ) function depends on the logical function L(Bq,Cq,Dq), which is implemented in stage 2 by Boolean logic module 1340 in the illustrated embodiment. Consequently, in the first cycle of MD5 execution on a given data block, stage 2 is configured to perform the function Ln(Bq,Cq,Dq) according to round 1 as shown above. The result is then passed through register L 12 for use during cycle 2.

In cycle 2 of the illustrated embodiment, stage 1 is active while stage 2 is idle. Stage 1 may be configured to perform the four-operand addition and the ROTL_s( ) function corresponding to the Bn term shown above. In the illustrated embodiment, during cycle 2, mux-flop V 14 may be configured to select its Aq input, mux-flop W 13 may be configured to select its W00 input (corresponding to the W[k] term), and mux-flop K 11 may be configured to select the appropriate constant K[i], which may be provided by a table or other suitable data structure external to stage 1. In the illustrated embodiment, the path through mux-flop X 15 may be unused during MD5 execution, and may be zeroed at mux-flop X 15, within bs__1__256 logic 1307, or at the input to 3:2 CSA 1320 by an appropriate control signal.

During cycle 2, adder 1330a (along with CSAs 1310 and 1320) may be configured to produce the sum of the four inputs presented to the input of stage 1, indicated in FIG. 14A as T12(Aq,L,W,K). Subsequently, rotate logic 1340 may be configured to perform the ROTL_s( ) function on the produced sum, indicated as rotate(T12,s).

At the beginning of cycle 3, the result of rotate logic 1340 is captured in register R 16, and the Bq operand is selected and captured in mux-flop S 17. Subsequently, adder 1330b may be configured to sum the rotated T12 result with the Bq operand, which is indicated in FIG. 14A as T3(Bq,T12). Once the T3 result has been produced, all of the next values of hash values An, Bn, Cn and Dn are known and may be written to their respective mux-flops 510 within hash queue 425 via the appropriate paths. Also, during cycle 3, stage 2 is configured to determine the logical function Ln(Bn,Cn,Dn) for the next iteration of the algorithm. During cycle 3, the value of Bn is the T3 result, and the values of Cn and Dn are Bq and Cq, respectively. Correspondingly, in the illustrated embodiment, the L0 18, L1 19 and L2 20 multiplexers may be configured to supply T3, Bq and Cq to Boolean logic module 1340.

Execution in cycle 4 and beyond may proceed in a manner similar to that of cycles 2 and 3, with stage 1 producing the T12 result during even-numbered cycles and stage 2 producing the T3 result dependent upon the T12 result during odd-numbered cycles. Thus, in one embodiment, an MD5 iteration is completed every other execution cycle. In some embodiments, the logic of stages 1 and 2 that is not used during a given idle cycle may be used for some other purpose, such as by providing additional inputs to the mux-flops bounding each stage. For example, in some embodiments hash logic 420 may be configured to compute an MD5 hash of a second, independent data block during the otherwise idle cycles in stages 1 and 2. In one embodiment, a single instance of SPU 240 may be shared by two or more of cores 100, and the second data block hashed during otherwise idle cycles may come from a different core 100 than the first data block. In such an embodiment, providing fewer instances of SPU 240 and/or hash logic 420 than instances of cores 100 may reduce implementation area. In an alternative embodiment, providing one instance of hash logic 420 per core 100 and processing a second data block during the otherwise idle cycles of hash logic 420 may effectively double the hashing throughput per core 100. It is noted that in some embodiments where multiple hash operations on different data blocks are interleaved within hash logic 420, word buffer 410 may be augmented with additional state elements (such as an additional flip-flop coupled to the output of each mux-flop 510, for example) to store the word buffer values for each outstanding hash operation.

Execution of the SHA-1 algorithm in the illustrated embodiment of stages 1 and 2 may be similar to execution of the MD5 algorithm just described. In one embodiment of the SHA-1 algorithm, for a single data block, a 160-bit (5 word) hash value is manipulated during the course of four rounds comprising 20 iterative steps each, for a total of 80 iterations per data block. During a given iteration, the next hash value may be determined as a function of the current hash value and other inputs as follows:

*An=Eq+L(Bq,Cq,Dq)+s5(Aq)+W[i]+K[i];*

*Bn=Aq;*

*Cn=s30(Bq);*

*Dn=Cq;*

*En=Dq;* where Aq through Eq denote the current hash value as stored in hash queue 425, and sN(X) denotes a circular left rotate of X by N bit positions. Additionally, L(Bq,Cq,Dq) denotes a logical function of three variables that varies according to the round being executed as follows (where round 1 corresponds to iterations 0 through 19, round 2 corresponds to iterations 20 through 39, round 3 corresponds to iterations 40 through 59, and round 4 corresponds to iterations 60 through 79):

| | |
|---|---|
| L(Bq,Cq,Dq) = (Bq & Cq) \| (~Bq & Dq); | Round 1 |
| L(Bq,Cq,Dq) = Bq ^ Cq ^ Dq; | Round 2 |
| L(Bq,Cq,Dq) = (Bq & Cq) \| (Bq & Dq) \| (Cq ^ Dq); | Round 3 |
| L(Bq,Cq,Dq) = Bq ^ Cq ^ Dq; | Round 4 |

Further, W[i] and K[i] denote, respectively, a word buffer entry and an additive constant each specific to the iteration i (i=0 to 79) being executed. (As noted above with respect to the MD5 algorithm, in some embodiments, the next word W required by hash logic 420 for the SHA-1 algorithm may be determined by word buffer 410 and conveyed via a fixed word position such as W00, while in other embodiments hash logic 420 may be configured to directly select the appropriate word from a variable word position of the word buffer.)

Referring collectively to FIG. 13 and FIG. 14B, in one embodiment stages 1 and 2 may be configured to execute the SHA-1 hash algorithm described above as follows. Similar to the MD5 algorithm, the five-input addition corresponding to An depends on the logical function L(Bq,Cq,Dq), which is implemented in stage 2 by Boolean logic module 1340 in the illustrated embodiment. Consequently, in the first cycle (i=0) of SHA-1 execution on a given data block, stage 2 is configured to perform the function Ln(Bq,Cq,Dq) according to round 1 as shown above. The result is then passed through register L 12 for use during cycle 2.

In cycle 2 of the illustrated embodiment, stage 1 is active while stage 2 is idle. Stage 1 may be configured to perform the four-operand addition corresponding to the rightmost terms of the An term shown above. In the illustrated embodiment, during cycle 2, mux-flop V 14 may be configured to select its s5(Aq) input, which may be hardwired to perform a left rotate function on Aq by 5 bit positions. Also, mux-flop W 13 may be configured to select its W00 input (corresponding to the W[i] term), and mux-flop K 11 may be configured to select the appropriate constant K[i], which may be provided by a table or other suitable data structure external to stage 1. In the illustrated embodiment, the path through mux-flop X 15 may be unused during SHA-1 execution, and may be zeroed at mux-flop X 15, within bs__1__256 logic 1307, or at the input to 3:2 CSA 1320 by an appropriate control signal. (In other embodiments, it is noted that the Eq term could be selected by mux-flop X15, and bs__1__256 logic 1307 could be configured to pass the Eq term unmodified, resulting in completion of the An arithmetic in a single execution cycle.)

During cycle 2, adder 1330a (along with CSAs 1310 and 1320) may be configured to produce the sum of the four inputs presented to the input of stage 1, indicated in FIG. 14B as T12(*s5*(Aq),L,W,K). Subsequently, rotate logic 1340 may be configured to rotate the sum T12 by zero bits (since no rotation is specified at this point in the SHA-1 algorithm), which is indicated as rotate(T12,0).

At the beginning of cycle 3, the result of rotate logic 1340 is captured in register R 16, and the Eq operand is selected and captured in mux-flop S 17. Subsequently, adder 1330b may be configured to sum the rotated T12 result with the Eq operand, which is indicated in FIG. 14B as T3(Eq,T12). Once the T3 result has been produced, all of the next values of hash values An, Bn, Cn, Dn and En are known and may be written to their respective mux-flops 510 within hash queue 425 via the appropriate paths. Also, during cycle 3, stage 2 is configured to determine the logical function Ln(Bn,Cn,Dn) for the next iteration of the algorithm. During cycle 3, the values of Bn, Cn and Dn are Aq, s30(Bq) and Cq, respectively. Correspondingly, in the illustrated embodiment, the L0 18, L1 19 and L2 20 multiplexers may be configured to supply Aq, s30(Bq) and Cq to Boolean logic module 1340.

Execution in cycle 4 and beyond may proceed in a manner similar to that of cycles 2 and 3, with stage 1 producing the T12 result during even-numbered cycles and stage 2 producing the T3 result dependent upon the T12 result during odd-numbered cycles. Thus, in one embodiment, a SHA-1 iteration is completed every other execution cycle. It is noted that during subsequent iterations, the value s5(Aq) required by a given iteration corresponds to the value s5(T3) at the end of the previous iteration; correspondingly, mux-flop V 14 may be configured to select its s5(T3) input during iterations subsequent to the first. As with the MD5 algorithm, in some embodiments, the logic of stages 1 and 2 that is not used during a given idle cycle may be used for some other purpose, such as by providing additional inputs to the mux-flops bounding each stage. For example, in some embodiments hash logic 420 may be configured to compute a SHA-1 hash of a second, independent data block during the otherwise idle cycles in stages 1 and 2. As noted above with respect to the MD5 algorithm, in various embodiments such interleaving of hash operations may be used to reduce implementation area through sharing hash logic 420 among multiple cores 100, or to increase available hash operation throughput for a given core 100.

Execution of the SHA-256 algorithm in the illustrated embodiment of stages 1 and 2 may be somewhat more complex than the SHA-1 and MD5 algorithms just described. In one embodiment of the SHA-256 algorithm, for a single data block, a 256-bit (8 word) hash value is manipulated during the course of 64 iterations per data block. During a given iteration, the next hash value may be determined as a function of the current hash value and other inputs as follows:

| | |
|---|---|
| An = | Hq + bs_1_256(Eq) + L(Eq,Fq,Gq) + W[i] + K[i] + bs_0_256(Aq) + Maj(Aq,Bq,Cq); |
| Bn = | Aq; |
| Cn = | Bq; |
| Dn = | Cq; |
| En = | Dq + Hq + bs_1_256(Eq) + L(Eq,Fq,Gq) + W[i] + K[i]; |
| Fn = | Eq; |
| Gn = | Fq; |
| Hn = | Gq; | where Aq through Hq denote the current hash value as stored in hash queue 425, and where W[i] and K[i] denote, respectively, a word buffer entry and an additive constant each specific to the iteration i (i=0 to 63) being executed. (As noted above with respect to the MD5 and SHA-1 algorithms, in some embodiments, the next word W required by hash logic 420 for the SHA-256 algorithm may be determined by word buffer 410 and conveyed via a fixed word position such as W00, while in other embodiments hash logic 420 may be configured to directly select the appropriate word from a variable word position of the word buffer.)

The SHA-256 algorithm uses several different logical functions of various hash value words. Here, L(Eq,Fq,Gq) and Maj(Aq,Bq,Cq) denote logical functions of three variables that may be defined as follows:

$$L(Eq,Fq,Gq) = (Eq\&Fq)|(\sim Eq\&Gq);$$

$$Maj(Aq,Bq,Cq) = (Aq\&Bq)|(Aq\&Cq)|(Bq\&Cq);$$

Further, bs_0_256(X) and bs_1_256(X) may be defined as:

$$bs\_0\_256(X) = ROTR\_2(X)\textasciicircum ROTR\_13(x)\textasciicircum ROTR\_22(X);$$

$$bs\_1\_256(X) = ROTR\_6(X)\textasciicircum ROTR\_11(x)\textasciicircum ROTR\_25(X);$$

where ROTR_N(X) denotes a logical rotate right of X by N bit positions.

Referring collectively to FIG. 13 and FIG. 14C, in one embodiment stages 1 and 2 may be configured to execute the SHA-256 hash algorithm described above as follows. First, it is noted that the first five operands added to form An are also common to En, and in particular this addition depends on the logical function L(Eq,Fq,Gq), which is implemented in stage 2 by Boolean logic module 1340 in the illustrated embodiment. Consequently, in the first cycle (i=0) of SHA-256 execution on a given data block, stage 2 is configured to perform the function Ln(Eq,Fq,Gq) according to round 1 as shown above. The result is then passed through register L 12 for use during cycle 2.

In cycle 2 of the illustrated embodiment, stage 1 may be configured to sum the first five operands of the An term shown above. In the illustrated embodiment, during cycle 2, mux-flop V 14 may be configured to select its Hq, mux-flop W 13 may be configured to select its W00 input (corresponding to the W[i] term), and mux-flop K 11 may be configured to select the appropriate constant K[i], which may be provided by a table or other suitable data structure external to stage 1. Also, mux-flop X 15 may be configured to select its Eq input, and bs_1_256 logic 1307 may be configured to compute bs_1_256(Eq) and present the result to 3:2 CSA 1320 to be added along with the output of 4:2 CSA 1310.

During cycle 2, adder 1330a (along with CSAs 1310 and 1320) may be configured to produce the sum of the five inputs presented to the input of stage 1, indicated in FIG. 14C as T12(Hq,bs_1(Eq),L,W,K). Subsequently, rotate logic 1340 may be configured to rotate the sum T12 by zero bits (since no rotation is specified at this point in the SHA-256 algorithm), which is indicated as rotate(T12,0). Also during cycle 2, majority logic 1305 of stage 2 may be configured to compute the Maj(Aq,Bq,Cq) function and bs_0_256 logic 1303 of stage 2 may be configured to compute the bs_0_256(Aq) function in preparation for cycle 3.

At the beginning of cycle 3, the result of rotate logic 1340 is captured in register R 16, and the Dq operand is selected and captured in mux-flop S 17. Also, the outputs of bs_0_256 logic 1303 and majority logic 1305 and the T12 sum produced by adder 1330a are selected and captured in mux-flops K 11, W 13 and V 14, respectively. During cycle 3 of the SHA-256 algorithm, unlike the previously discussed algorithms, both stage 1 and stage 2 are active in the illustrated embodiment. Specifically, adder 1330b may be configured to sum the T12 result with the Dq operand to produce the En value, which is indicated in FIG. 14C as T3(Dq,T12). Also, adder 1330*a* may be configured to sum the T12 result with the bs_0_256(Aq) and Maj(Aq,Bq,Cq) values to produce the An value, which is indicated in FIG. 14C as T12(T12,bs_0 (Aq),Maj(Aq,Bq,Cq). Once the T3 result and the new T12 result have been produced during cycle 3, all of the next values of hash values An through Hn are known and may be written to their respective mux-flops 510 within hash queue 425 via the appropriate paths. Also, during cycle 3, stage 2 is configured to determine the logical function Ln(En,Fn,Gn) for the next iteration of the algorithm. During cycle 3, the values of En, Fn and Gn are the T3 sum produced by adder 1330*b*, Eq and Fq, respectively. Correspondingly, in the illustrated embodiment, the L0 18, L1 19 and L2 20 multiplexers may be configured to supply T3, Eq and Fq to Boolean logic module 1340.

Execution in cycle 4 and beyond may proceed in a manner similar to that of cycles 2 and 3, with stage 1 producing the T12 result during even-numbered cycles and stages 1 and 2 producing the new T12 result (i.e., the An value) and the T3 result (i.e., the En value) dependent upon the T12 result during odd-numbered cycles. Thus, in one embodiment, a SHA-256 iteration is completed every other execution cycle. It is noted that during subsequent iterations, the values Hq and Eq required by a given iteration correspond to the value Gq and the T3 sum produced during the previous iteration; correspondingly, mux-flops V 14 and X 15 may be respectively configured to select their Gq and T3 inputs during iterations subsequent to the first.

It is noted that in the embodiment of stages 1 and 2 illustrated in FIG. 13, only two adders 1330 are needed to implement all three of the MD5, SHA-1 and SHA-256 hash algorithms. Since fast adders (e.g., carry lookahead adders) of the type commonly used for adders 1330 typically require substantial implementation area (in comparison to CSAs, for example), minimizing the number of adders required may reduce the overall area required by hash logic 420, thus potentially improving its cost and performance. It is contemplated that in other embodiments, hash logic 420 may be configured to implement other hash algorithms than the ones specifically described above, including hash algorithms that operate on larger data blocks and produce larger hash values (e.g., SHA-384, SHA-512). For example, stages 1 and 2 may be configured to accommodate hash algorithms that process 1024-bit data blocks using 64-bit words by widening the datapath to 64 bits or by configuring algorithm iterations to make multiple passes through stages 1 and 2 to synthesize 64-bit arithmetic from 32-bit arithmetic.

It is noted that in an embodiment of stage 1 that is configured to provide an additional instance of a 3:2 CSA as well as an additional adder 1330, the additional adder logic may be configured to perform the stage 1 arithmetic illustrated in the odd cycles 3, 5, etc. of the SHA-256 algorithm shown in FIG. 14C. In such an embodiment, providing such additional adder logic may free adder 1330*a* and its upstream CSAs to perform a SHA-256 hash operation on a different data block in an interleaved fashion, similar to that described above with respect to the MD5 and SHA-1 algorithms. That is, a second data block may be processed in stage 1 during odd cycles 3, 5, etc. and in stage 2 during even cycles 4, 6, etc. As described above, such interleaving of operations may enable sharing of hash logic 420 among multiple cores 100, which may result in area savings greater than the cost of the additional CSA and adder 1330 used to enable interleaving. Alternatively, interleaving may increase hash operation throughput available to a given core 100 as described above. Additionally, it is noted that in some embodiments where interleaving of hash operations is supported, the interleaved operations need not correspond to the same hash algorithm. For example, in some embodiments, a first hash operation executed by hash logic 420 may be any of an MD5 operation, a SHA-1 operation, a SHA-256 operation, or another suitable hash operation. A second hash operation interleaved within execution cycles unused by the first hash operation may also be any of the aforementioned operations, and may be of the same type as (i.e., equivalent to) or a different type from the first hash operation. Thus, MD5 operations may be interleaved with SHA-1 operations, or in suitable embodiments with SHA-256 operations. Further, it is contemplated that in some embodiments 32-bit hash operations such as MD5, SHA-1, and SHA-256 operations may be interleaved with 64-bit hash operations such as SHA-384 and SHA-512, for example.

As described above, for a given data block, a particular hash algorithm may specify a number of iterations to be performed in order to compute a hash value for that given data block, which may be stored within hash queue 425 at the end of the specified set of iterations. However, a given message to be hashed may comprise multiple data blocks. In this case, many hash algorithms (including the MD5, SHA-1 and SHA-256 algorithms) specify that the initial value of hash queue 425 be set to the previous hash value of the message (or to a predetermined initial value in the case of hashing the first data block of a message) prior to beginning iteration on the current data block. At the completion of iteration on the current data block, the current hash value of the message being processed may be defined as the sum of the previous hash value of the message and the hash value of the current data block (e.g., as stored in hash queue 425).

In the embodiment illustrated in FIG. 11, chaining variable storage 427 may be configured to provide storage for the message hash value. For example, in one embodiment chaining variable storage 427 may comprise a plurality of mux-flops (not shown), each corresponding to a mux-flop 510 of hash queue 425. At the end of iteration on a given data block, hash logic 420 may be configured to sum the corresponding values of chaining variable storage 427 and hash queue 425, and to store the sum back to both hash queue 425, where it may be used as the initial hash value at the beginning of iteration for the next data block, and to chaining variable storage 427, where it may be used at the end of iteration on the next data block.

For example, in one embodiment, hash logic 420 may be configured to perform this summation one word at a time over several execution cycles by supplying corresponding words from hash queue 425 and chaining variable storage 427 as inputs to stage 1 (not shown in FIG. 13, but which may be added to any suitable mux-flop). The number of words to be summed may vary depending on the hash algorithm in use; as described above, for the MD5, SHA-1 and SHA-256 hash algorithms, hash values are 128 bits, 160 bits and 256 bits in width, respectively (i.e., 4, 5 or 8 words). In some embodiments, the adder path of stage 2 may be used concurrently with stage 1 to speed completion of the chaining variable summation. It is noted that in some embodiments, chaining variable summation in stages 1 and 2 may create a stall condition such as described previously. That is, hash value computation of the next data block may not commence until chaining variable summation for a previous block is complete. Thus, in some embodiments word buffer 410 may stall during chaining variable summation. However, as noted above, if word buffer 410 has not completely been filled with the next data block at the time chaining variable summation for the previous block commences, in some embodiments word buffer 410 may continue filling without stalling.

Exemplary System Embodiment

Figure 15:
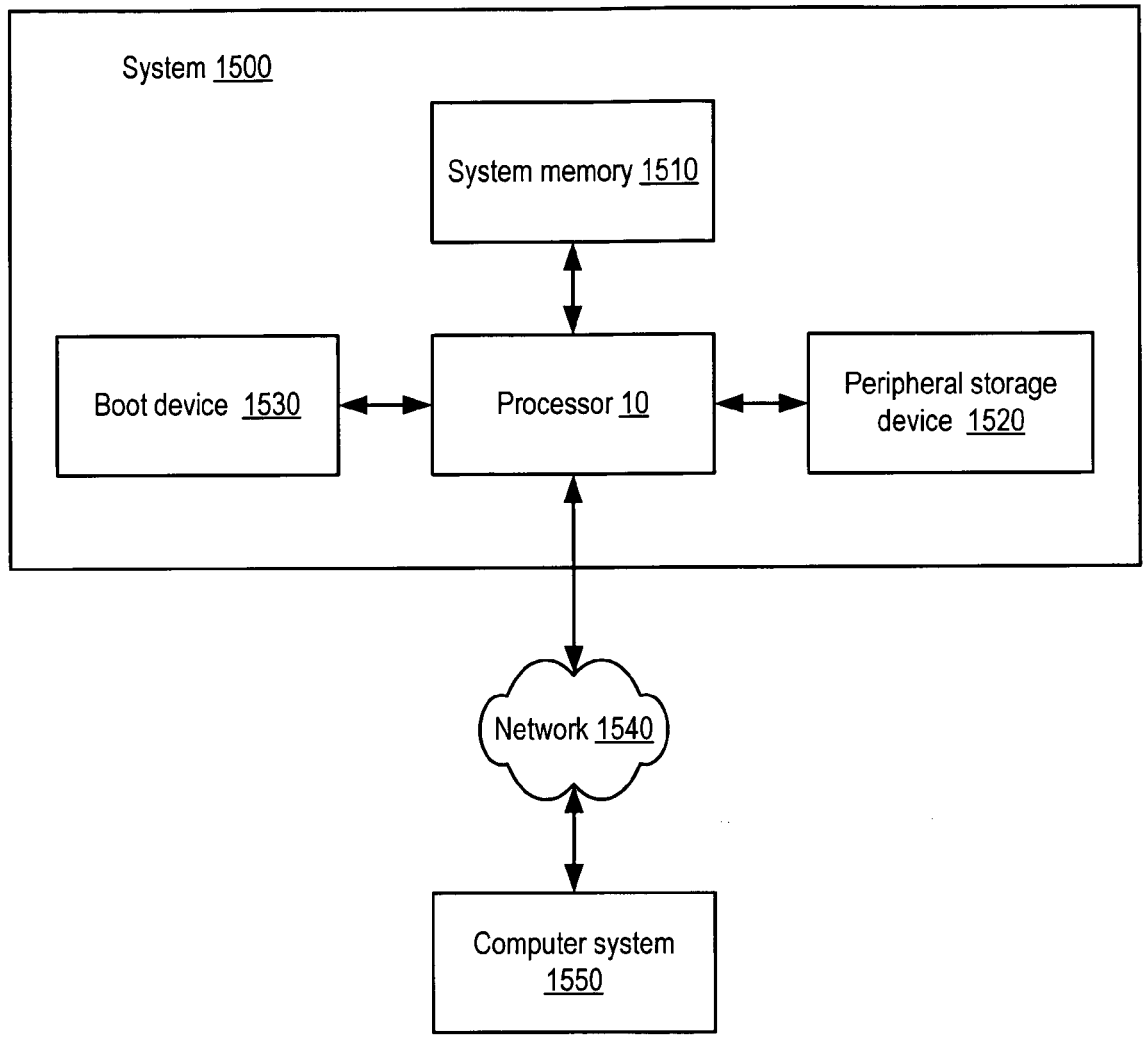
FIG. 15 is a block diagram illustrating one embodiment of a system including a multithreaded processor.

As described above, in some embodiments SPU 240 including either an embodiment of word buffer 410 as illustrated in FIG. 5A through FIG. 9, an embodiment of hash logic 420 as illustrated in FIG. 11 through FIGS. 14A-C, or both may be included within a processor core 100 as illustrated in FIG. 2. In turn, one or more processor cores 100 may be included within a processor 10 as illustrated in FIG. 1. In some embodiments, processor 10 may be configured to interface with a number of external devices. One embodiment of a system including processor 10 is illustrated in FIG. 15. In the illustrated embodiment, system 1500 includes an instance of processor 10 coupled to a system memory 1510, a peripheral storage device 1520 and a boot device 1530. System 1500 is coupled to a network 1540, which is in turn coupled to another computer system 1550. In some embodiments, system 1500 may include more than one instance of the devices shown, such as more than one processor 10, for example. In various embodiments, system 1500 may be configured as a rack-mountable server system, a standalone system, or in any other suitable form factor. In some embodiments, system 1500 may be configured as a client system rather than a server system.

In various embodiments, system memory 1510 may comprise any suitable type of system memory as described above, such as FB-DIMM, DDR/DDR2 SDRAM, or RDRAM®, for example. System memory 1510 may include multiple discrete banks of memory controlled by discrete memory interfaces in embodiments of processor 10 configured to provide multiple memory interfaces 130. Also, in some embodiments system memory 1510 may include multiple different types of memory.

Peripheral storage device 1520, in various embodiments, may include support for magnetic, optical, or solid-state storage media such as hard drives, optical disks, nonvolatile RAM devices, etc. In some embodiments, peripheral storage device 1520 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 1530 may include a device such as an FPGA or ASIC configured to coordinate initialization and boot of processor 10, such as from a power-on reset state. Additionally, in some embodiments boot device 1530 may include a secondary computer system configured to allow access to administrative functions such as debug or test modes of processor 10.

Network 1540 may include any suitable devices, media and/or protocol for interconnecting computer systems, such as wired or wireless Ethernet, for example. In various embodiments, network 1540 may include local area networks (LANs), wide area networks (WANs), telecommunication networks, or other suitable types of networks. In some embodiments, computer system 1550 may be similar to or identical in configuration to illustrated system 1500, whereas in other embodiments, computer system 1550 may be substantially differently configured. For example, computer system 1550 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A cryptographic unit, comprising:
hash logic configured to compute a hash value of a data block according to a hash algorithm, wherein said hash algorithm includes a plurality of iterations and a plurality of rounds, each round comprising one or more of said plurality of iterations, and wherein said data block includes a plurality of data words; and
a word buffer comprising a plurality of data word positions and configured to store said data block during computing by said hash logic, wherein subsequent to said hash logic computing one of said iterations of said hash algorithm, said word buffer is further configured to perform a linear shift to linearly shift said data block by one or more data word positions according to said hash algorithms;
wherein said word buffer is further configured to perform, subsequent to said hash logic computing one of said rounds, a reordering of data words stored at two or more of the plurality of word positions, wherein said reordering is distinct from said linear shift;
wherein said hash algorithm is dynamically selectable from a plurality of hash algorithms.

2. The cryptographic unit as recited in claim 1, wherein during computation of a given iteration of said hash algorithm, said hash logic is further configured to receive an input data word from a fixed data word position of said word buffer.

3. The cryptographic unit as recited in claim 2, wherein said fixed data word position corresponds to a least significant data word position, wherein in response to said linear shifting of said data block, a most significant data word position becomes vacant, and wherein in response to said most significant data word position becoming vacant, said word buffer is further configured to linearly shift a least significant data word of a new data block into said most significant data word position.

4. The cryptographic unit as recited in claim 2, wherein said fixed data word position corresponds to a least significant data word position, wherein in response to said linear shifting of said data block, a data word position other than a most significant data word position becomes vacant, and wherein in response to said other data word position becoming vacant, said word buffer is further configured to load a data word of a new data block into said other data word position.

5. The cryptographic unit as recited in claim 1, wherein during a first mode of operation, said hash algorithm is compliant with a version of Message Digest 5 (MD5) hash functionality.

6. The cryptographic unit as recited in claim 5, wherein during said first mode of operation, subsequent to said hash logic computing said iteration of said hash algorithm, said word buffer is configured to logically rotate a data word linearly shifted out of a least significant data word position into a most significant data word position.

7. The cryptographic unit as recited in claim 1, wherein said linear shifting of said data block includes shifting a next data word value into a most significant data word position of said word buffer.

8. The cryptographic unit as recited in claim 7, wherein during a second mode of operation, said hash algorithm is compliant with a version of Secure Hash Algorithm-1 (SHA-1) hash functionality, and wherein said next data word value is determined according to said hash algorithm.

9. The cryptographic unit as recited in claim 7, wherein during a third mode of operation, said hash algorithm is compliant with a version of Secure Hash Algorithm-256 (SHA-256) hash functionality, and wherein said next data word value is determined according to said hash algorithm.

10. The cryptographic unit as recited in claim 1, wherein said linear shifting of said data block includes shifting a next data word value into a least significant data word position of said word buffer.

11. A processor, comprising:
the cryptographic unit as recited in claim 1; and
instruction fetch logic configured to issue a first instruction from one of a plurality of threads during one execution cycle and to issue a second instruction from another one of said plurality of threads during a successive execution cycle;
wherein said cryptographic unit is configured to execute independently of said instruction fetch logic.

12. A processor, comprising:
the cryptographic unit as recited in claim 1; and
instruction fetch logic configured to issue a plurality of instructions including a first and a second instruction, wherein said first instruction is issued from one of a plurality of threads during one execution cycle, and wherein said second instruction is issued from another one of said plurality of threads during a successive execution cycle;
wherein said cryptographic unit is configured to execute one of said plurality of instructions issued by said instruction fetch logic.

13. A method, comprising:
dynamically selecting a hash algorithm from a plurality of hash algorithms;
computing a hash value of a data block according to a hash algorithm, wherein said hash algorithm includes a plurality of iterations and a plurality of rounds, each comprising one or more of said plurality of iterations, and wherein said data block includes a plurality of data words;
storing said data block during said computing in a word buffer comprising a plurality of data word positions;
subsequent to computing one of said iterations of said hash algorithm, performing a liner shift to linearly shift said data block by one or more data word positions according to said hash algorithm; and
subsequent to computing one of said rounds, reordering data words stored at two or more of the plurality of word positions, wherein said reordering is distinct from said linear shift.

14. The method as recited in claim 12, further comprising:
during computation of a given iteration of said hash algorithm, receiving an input data word from a fixed data word position of said word buffer.

15. The method as recited in claim 14, wherein said fixed data word position corresponds to a least significant data word position, and wherein the method further comprises:
in response to said linear shifting of said data block, a most significant data word position becoming vacant; and
in response to said most significant data word position becoming vacant, linearly shifting a least significant data word of a new data block into said most significant data word position.

16. The method as recited in claim 14, wherein said fixed data word position corresponds to a least significant data word position, and wherein the method further comprises:
in response to said linear shifting of said data block, a data word position other than a most significant data word position becoming vacant; and
in response to said other data word position becoming vacant, loading a data word of a new data block into said other data word position.

17. The method as recited in claim 14, wherein during a first mode of operation, said hash algorithm is compliant with a version of Message Digest 5 (MD5) hash functionality.

18. The method as recited in claim 17, further comprising:
during said first mode of operation and subsequent to said hash logic computing said iteration of said hash algorithm, logically rotating a data word linearly shifted out of a least significant data word position into a most significant data word position.

19. The method as recited in claim 13, wherein said linear shifting of said data block includes shifting a next data word value into a most significant data word position of said word buffer.

20. The method as recited in claim 19, wherein during a second mode of operation, said hash algorithm is compliant with a version of Secure Hash Algorithm-1 (SHA-1) hash functionality, and wherein said next data word value is determined according to said hash algorithm.

21. The method as recited in claim 19, wherein during a third mode of operation, said hash algorithm is compliant with a version of Secure Hash Algorithm-256 (SHA-256) hash functionality, and wherein said next data word value is determined according to said hash algorithm.

22. The method as recited in claim 13, wherein said linear shifting of said data block includes shifting a next data word value into a least significant data word position of said word buffer.

23. The method as recited in claim 13, further comprising:
issuing a first instruction from one of a plurality of threads during one execution cycle; and
issuing a second instruction from another one of said plurality of threads during a successive execution cycle;
wherein computing said hash value is configured to operate independently of issuing instructions from said plurality of threads.

24. The method as recited in claim 13, further comprising:
issuing a plurality of instructions including a first instruction and a second
instruction, wherein said first instruction is issued from one of a plurality of threads during one execution cycle, and wherein said second instruction is issued from another one of said plurality of threads during a successive execution cycle;
wherein computing said hash value occurs in response to issuing one of said plurality of instructions.

25. A system, comprising:
a system memory; and
a processor coupled to said system memory and comprising a cryptographic unit, said cryptographic unit comprising:
hash logic configured to compute a hash value of a data block according to a hash algorithm, wherein said hash algorithm includes a plurality of iterations and a plurality of rounds, each comprising one or more of said plurality of iterations, and wherein said data block includes a plurality of data words; and
a word buffer comprising a plurality of data word positions and configured to store said data block during computing by said hash logic, wherein subsequent to said hash logic computing one of said iterations of said hash algorithm, said word buffer is further configured to perform a linear shift to linearly shift said data block by one or more data word positions according to said hash algorithm;

wherein said word buffer is further configured to perform, subsequent to said hash logic computing one of said rounds, a reordering of data words stored at two or more of the plurality of word positions, wherein said reordering is distinct from said linear shift wherein said hash algorithm is dynamically selectable from a plurality of hash algorithms.

26. The system as recited in claim 25, wherein during computation of a given iteration of said hash algorithm, said hash logic is further configured to receive an input data word from a fixed data word position of said word buffer.

27. The system as recited in claim 26, wherein said fixed data word position corresponds to a least significant data word position, wherein in response to said linear shifting of said data block, a most significant data word position becomes vacant, and wherein in response to said most significant data word position becoming vacant, said word buffer is further configured to linearly shift a least significant data word of a new data block into said most significant data word position.

28. The system as recited in claim 26, wherein said fixed data word position corresponds to a least significant data word position, wherein in response to said linear shifting of said data block, a data word position other than a most significant data word position becomes vacant, and wherein in response to said other data word position becoming vacant, said word buffer is further configured to load a data word of a new data block into said other data word position.

29. The system as recited in claim 25, wherein during a first mode of operation, said hash algorithm is compliant with a version of Message Digest 5 (MD5) hash functionality.

30. The system as recited in claim 29, wherein during said first mode of operation, subsequent to said hash logic computing said iteration of said hash algorithm, said word buffer is configured to logically rotate a data word linearly shifted out of a least significant data word position into a most significant data word position.

31. The system as recited in claim 25, wherein said linear shifting of said data block includes shifting a next data word value into a most significant data word position of said word buffer.

32. The system as recited in claim 31, wherein during a second mode of operation, said hash algorithm is compliant with a version of Secure Hash Algorithm-1 (SHA-1) hash functionality, and wherein said next data word value is determined according to said hash algorithm.

33. The system as recited in claim 31, wherein during a third mode of operation, said hash algorithm is compliant with a version of Secure Hash Algorithm-256 (SHA-256) hash functionality, and wherein said next data word value is determined according to said hash algorithm.

34. The system as recited in claim 25, wherein said linear shifting of said data block includes shifting a next data word value into a most significant data word position of said word buffer.

35. The system as recited in claim 25, wherein said processor further comprises instruction fetch logic configured to issue a first instruction from one of a plurality of threads during one execution cycle and to issue a second instruction from another one of said plurality of threads during a successive execution cycle, wherein said cryptographic unit is configured to execute independently of said instruction fetch logic.

36. The system as recited in claim 25, wherein said processor further comprises instruction fetch logic configured to issue a plurality of instructions including a first and a second instruction, wherein said first instruction is issued from one of a plurality of threads during one execution cycle, wherein said second instruction is issued from another one of said plurality of threads during a successive execution cycle, and wherein said cryptographic unit is configured to execute one of said plurality of instructions issued by said instruction fetch logic.

* * * * *

UNITED STATES PATENT AND TRADEMARK OFFICE
CERTIFICATE OF CORRECTION

PATENT NO. : 7,720,219 B1  Page 1 of 1
APPLICATION NO. : 10/968406
DATED : May 18, 2010
INVENTOR(S) : Christopher H. Olson et al.

It is certified that error appears in the above-identified patent and that said Letters Patent is hereby corrected as shown below:

In column 4, line 36, delete "memory," and insert -- memory --, therefor.

In column 15, line 17, delete "1N1" and insert -- IN1 --, therefor.

In column 15, line 60, delete "W00" and insert -- W01 --, therefor.

In column 15, line 25, delete "be'rotated" and insert -- be rotated --, therefor.

In column 17, line 61, delete "W[16]=ROTL_11(W[00]^W[02]^[08]^W[13])" and insert -- W[16]=ROTL_1(W[00]^W[02]^W[08]^W[13]) --, therefor.

In column 24, line 33, delete "Dg);" and insert -- Dq); --, therefor.

In column 33, line 49, in claim 14, delete "claim 12," and insert -- claim 13, --, therefor.

Signed and Sealed this
Twenty-fourth Day of July, 2012

David J. Kappos
*Director of the United States Patent and Trademark Office*